US012325420B2

(12) United States Patent
Zeiynali Farid et al.

(10) Patent No.: US 12,325,420 B2
(45) Date of Patent: Jun. 10, 2025

(54) MAINTAINING A RANGE OF A GAP BETWEEN AN EGO VEHICLE AND A PRECEDING VEHICLE

(71) Applicant: Toyota Motor Engineering & Manufacturing North America, Inc., Plano, TX (US)

(72) Inventors: Yashar Zeiynali Farid, Berkeley, CA (US); Kentaro Oguchi, Mountain View, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 269 days.

(21) Appl. No.: 18/078,499

(22) Filed: Dec. 9, 2022

(65) Prior Publication Data

US 2024/0190434 A1 Jun. 13, 2024

(51) Int. Cl.
*B60W 30/17* (2020.01)
*B60W 40/10* (2012.01)

(52) U.S. Cl.
CPC .......... *B60W 30/17* (2013.01); *B60W 40/10* (2013.01); *B60W 2554/80* (2020.02); *B60W 2556/45* (2020.02)

(58) Field of Classification Search
CPC .. B60W 30/17; B60W 40/10; B60W 2554/80; B60W 2556/45; B60W 50/0097;
(Continued)

(56) References Cited

U.S. PATENT DOCUMENTS

| 2017/0259822 A1 | 9/2017 | Schubert | |
| 2018/0194352 A1* | 7/2018 | Avedisov | ............... G08G 1/163 |
| 2022/0363279 A1* | 11/2022 | Kwon | ............. B60W 30/18018 |

FOREIGN PATENT DOCUMENTS

CN 111016894 A 4/2020

OTHER PUBLICATIONS

Stern et al. "Dissipation of stop-and-go waves via control of autonomous vehicle" Transportation Research Part C: Emerging Technologies, vol. 89, 2018, pp. 205-221, ISSN 0968-090X, (Year: 2018).*

(Continued)

*Primary Examiner* — Faris S Almatrahi
*Assistant Examiner* — Dana F Artimez
(74) *Attorney, Agent, or Firm* — Christopher G. Darrow; Darrow Mustafa PC

(57) ABSTRACT

A system for maintaining a range of a gap between an ego vehicle and a preceding vehicle can include a processor and a memory. The memory can store a calculations module and an actuation module. The calculations module can cause the processor to determine a time, during a deceleration phase or an acceleration phase of a stop-and-go cycle of the preceding vehicle, when a preceding vehicle speed will equal a desired speed of the ego vehicle. The calculations module can cause the processor to determine: (1) in response to the time being during the deceleration phase, that the gap will be smaller than a desired maximum gap or (2) in response to the time being during the acceleration phase, that the gap will be larger than a desired minimum gap. The actuation module can cause the processor to change an ego vehicle speed to correct the gap.

20 Claims, 9 Drawing Sheets

(58) Field of Classification Search
CPC .. B60W 2050/0022; B60W 2050/0031; B60W 2050/0088; B60W 2520/10; B60W 2520/105; B60W 2554/802; B60W 2720/12; B60W 30/18018; B60W 30/16

See application file for complete search history.

(56) References Cited

OTHER PUBLICATIONS

C. Wu, A. M. Bayen and A. Mehta, "Stabilizing Traffic with Autonomous Vehicles," 2018 IEEE International Conference on Robotics and Automation (ICRA), Brisbane, QLD, Australia, 2018, pp. 6012-6018, doi: 10.1109/ICRA.2018.8460567. (Year: 2018).*

Canale et al. "Personalization of ACC Stop and Go Task Based on Human Driver Behaviour Analysis," IFAC Proceedings vols. vol. 35, issue 1, 2002, pp. 357-362.

Stern et al. "Dissipation of stop-and-go waves via control of autonomous vehicles: Field experiments," Transportation Research Part C: Emerging Technologies, vol. 89, Apr. 2018, pp. 205-221.

He et al. "A Jam-Absorption Driving Strategy for Mitigating Traffic Oscillations," in IEEE Transactions on Intelligent Transportation Systems, vol. 18, No. 4, pp. 802-813.

Tadaki et al. "Phase transition in traffic jam experiment on a circuit," New Journal of Physics, vol. 15, Oct. 2015, pp. 1-20.

Schakel et al. "Effects of Cooperative Adaptive Cruise Control on Traffic Flow Stability," 13th International IEEE Conference on Intelligent Transportation Systems, 2010, pp. 759-764.

Kesting et al., "Adaptive cruise control design for active congestion avoidance," Transportation Research Part C 16, 2008, pp. 668-683.

Unknown, "Accordion effect," last accessed on Aug. 11, 2022, 2 pages, found at https://en.wikipedia.org/wiki/Accordion_effect.

Unknown, "Road surface," last accessed on Nov. 10, 2022, 16 pages, found at https://en.wikipedia.org/wiki/Road_surface.

Unknown, "Traffic," last accessed on Nov. 7, 2022, 15 pages, found at https://en.wikipedia.org/wiki/Traffic.

Unknown, "Traffic congestion," last accessed on Dec. 8, 2022, 29 pages, found at https://en.wikipedia.org/wiki/Traffic_congestion.

Unknown, "Traffic wave," last accessed on Oct. 10, 2022, 2 pages, found at https://en.wikipedia.org/wiki/Traffic_wave.

Suh et al., "An Empirical Study on the Traffic State Evolution and Stop-and-Go Traffic Development on Freeways," Transportmetrica A Transport Science, vol. 12, No. 1, 2016, pp. 80-97.

Malikopoulos et al., "Optimal Control for Speed Harmonization of Automated Vehicles," IEEE Transactions on Intelligent Transportation Systems, 2018, pp. 1-13.

Li et al., "Cooperative Perception for Estimating and Predicting Microscopic Traffic States to Manage Connected and Automated Traffic," IEEE Transactions on Intelligent Transportation Systems, vol. 23, No. 8, pp. 13694-13707.

Yuan et al., "Real-Time Lagrangian Traffic State Estimator for Freeways," IEEE Transactions on Intelligent Transportation Systems, vol. 13, No. 1, pp. 59-70.

Mladen Čičić, "Modelling and Lagrangian Control of Mixed Traffic: Platoon Coordination, Congestion Dissipation and State Reconstruction," Doctoral Thesis in Electrical Engineering, KTH Royal Institute of Technology, Stockholm, Sweden, 2021, 257 pages.

Suriyarachchi et al., "Shock Wave Mitigation in Multi-Lane Highways Using Vehicle-to-Vehicle Communication," 2021 IEEE 94th Vehicular Technology Conference (VTC2021-Fall), 2021, pp. 1-7.

Zheng et al., "Freeway traffic oscillations: Microscopic analysis of formations and propagations using Wavelet Transform," Procedia Social and Behavioral Sciences 17, 2011, pp. 717-731.

Sugiyama et al., "Traffic jams without bottlenecks-experimental evidence for the physical mechanism of the formation of a jam," New Journal of Physics, vol. 10 033001, 2008, pp. 1-7.

William Beaty, "Traffic Experiments and a Cure for Waves & Jams," last accessed on Jun. 6, 2022, 13 pages, found at http://www.amasci.com/amateur/traffic/trafexp.html.

Cui et al., "Stabilizing traffic flow via a single autonomous vehicle: Possibilities and limitations," 2017 IEEE Intelligent Vehicles Symposium (IV), 2017, pp. 1336-1341.

Wu et al., "Stabilizing Traffic with Autonomous Vehicles," 2018 IEEE International Conference on Robotics and Automation (ICRA), 2018, pp. 6012-6018.

Goulet et al., "Impacts of distributed speed harmonization and optimal maneuver planning on multi-lane roads," 2020 IEEE Conference on Control Technology and Applications (CCTA), 2020, pp. 305-311.

Xie et al., "Cooperative driving strategies of connected vehicles for stabilizing traffic flow," Transportmetrica B: Transport Dynamics, 2020, V. 8 (1), pp. 166-181.

Hale et al., "Introduction of Cooperative Vehicle-to-Infrastructure Systems to Improve Speed Harmonization, Federal Highway Administration," Mar. 1, 2016, 54 pages.

Kates et al., "Flow stabilization and enhanced traffic performance using inter-vehicle communication and distributed Intelligence," 13th World Congress on Intelligent Transport Systems and Services, 2006, pp. 1-8.

Learn et al., "Freeway speed harmonization experiment using connected and automated vehicles, " IET Intelligent Transport Systems, (2018) V 12 (5), pp. 319-326.

U.S. Dept. of Transportation, "Freight Performance Measure Approaches for Bottlenecks, Arterials, and Linking Volumes to Congestion Report," Aug. 2015, 104 pages, found at https://rosap.ntl.bts.gov/view/dot/41268/dot_41268_DS1.pdf.

Čičić et al., "Platoon-Actuated Variable Area Mainstream Traffic Control for Bottleneck Decongestion," European Journal of Control, vol. 68, Nov. 2022, pp. 1-8.

Čičić et al., "Coordinating Vehicle Platoons for Highway Bottleneck Decongestion and Throughput Improvement," IEEE Transactions on Intelligent Transportation Systems, vol. 23, No. 7, Jul. 2022, pp. 8959-8971.

Ibrahim et al., "Control of Platooned Vehicles in Presence of Traffic Shock Waves," 2019 IEEE Intelligent Transportation Systems Conference (ITSC), 2019, pp. 1727-1734.

Chou et al., "The Lord of the Ring Road: A Review and Evaluation of Autonomous Control Policies for Traffic in a Ring Road," ACM Transactions on Cyber-Physical Systems, vol. 6, No. 1, Jan. 2022, pp. 1-2.

Nishi et al., "Theory of jam-absorption driving," Transportation Research Part B 50, 2013, pp. 116-129.

Di Vaio et al., "Cooperative Shock Waves Mitigation in Mixed Traffic Flow Environment," IEEE Transactions on Intelligent Transportation Systems, vol. 20, No. 12, pp. 4339-4353.

Li et al., "Stop-and-go traffic analysis: Theoretical properties, environmental impacts and oscillation mitigation," Transportation Research Part B 70, 2014, pp. 319-339.

\* cited by examiner

MAINTAINING A RANGE OF A GAP BETWEEN AN EGO VEHICLE AND A PRECEDING VEHICLE

TECHNICAL FIELD

The disclosed technologies are directed to maintaining a range of a gap between an ego vehicle and a preceding vehicle.

BACKGROUND

Cruise control can be a system for automatically controlling a speed of an ego vehicle. An operator of the ego vehicle can select the speed. A cruise control system can include a servomechanism to control a position of a throttle of the ego vehicle to maintain the speed. Advantages of cruise control can include, for example, one or more of a reduction in a degree of fatigue of the operator of the ego vehicle, an assurance that the speed of the ego vehicle is less than a regulatory speed limit, an increase in a fuel efficiency of the ego vehicle, or the like. More recently, technologies for cruise control have been developed so that a cruise control system can control a braking system of the ego vehicle, in conjunction with control of the position of the throttle, to maintain a distance (e.g., a gap) between the ego vehicle and a preceding vehicle. Such a cruise control system can be referred to as adaptive cruise control.

SUMMARY

In an embodiment, a system for maintaining a range of a gap between an ego vehicle and a preceding vehicle can include a processor and a memory. The memory can store a calculations module and an actuation module. The calculations module can cause the processor to determine a time, during a deceleration phase or an acceleration phase of a stop-and-go cycle of the preceding vehicle, when a preceding vehicle speed will equal a desired speed of the ego vehicle. The calculations module can cause the processor to determine: (1) in response to the time being during the deceleration phase, that the gap will be smaller than a desired maximum gap or (2) in response to the time being during the acceleration phase, that the gap will be larger than a desired minimum gap. The actuation module can cause the processor to change an ego vehicle speed to correct the gap.

In another embodiment, a method for maintaining a range of a gap between an ego vehicle and a preceding vehicle can include determining, by a processor, a time, during a deceleration phase or an acceleration phase of a stop-and-go cycle of a preceding vehicle, when a preceding vehicle speed will equal a desired speed of an ego vehicle. The method can include determining, by the processor: (1) in response to the time being during the deceleration phase, that a gap, between the preceding vehicle and the ego vehicle, will be smaller than a desired maximum gap or (2) in response to the time being during the acceleration phase, that the gap will be larger than a desired minimum gap. The method can include changing, by the processor, an ego vehicle speed to correct the gap.

In another embodiment, a non-transitory computer-readable medium for maintaining a range of a gap between an ego vehicle and a preceding vehicle can include instructions that, when executed by one or more processors, cause the one or more processors to determine, a time, during a deceleration phase or an acceleration phase of a stop-and-go cycle of a preceding vehicle, when a preceding vehicle speed will equal a desired speed of an ego vehicle. The non-transitory computer-readable medium can include instructions that, when executed by one or more processors, cause the one or more processors to determine: (1) in response to the time being during the deceleration phase, that a gap, between the preceding vehicle and the ego vehicle, will be smaller than a desired maximum gap or (2) in response to the time being during the acceleration phase, that the gap will be larger than a desired minimum gap. The non-transitory computer-readable medium can include instructions that, when executed by one or more processors, cause the one or more processors to change an ego vehicle speed to correct the gap.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
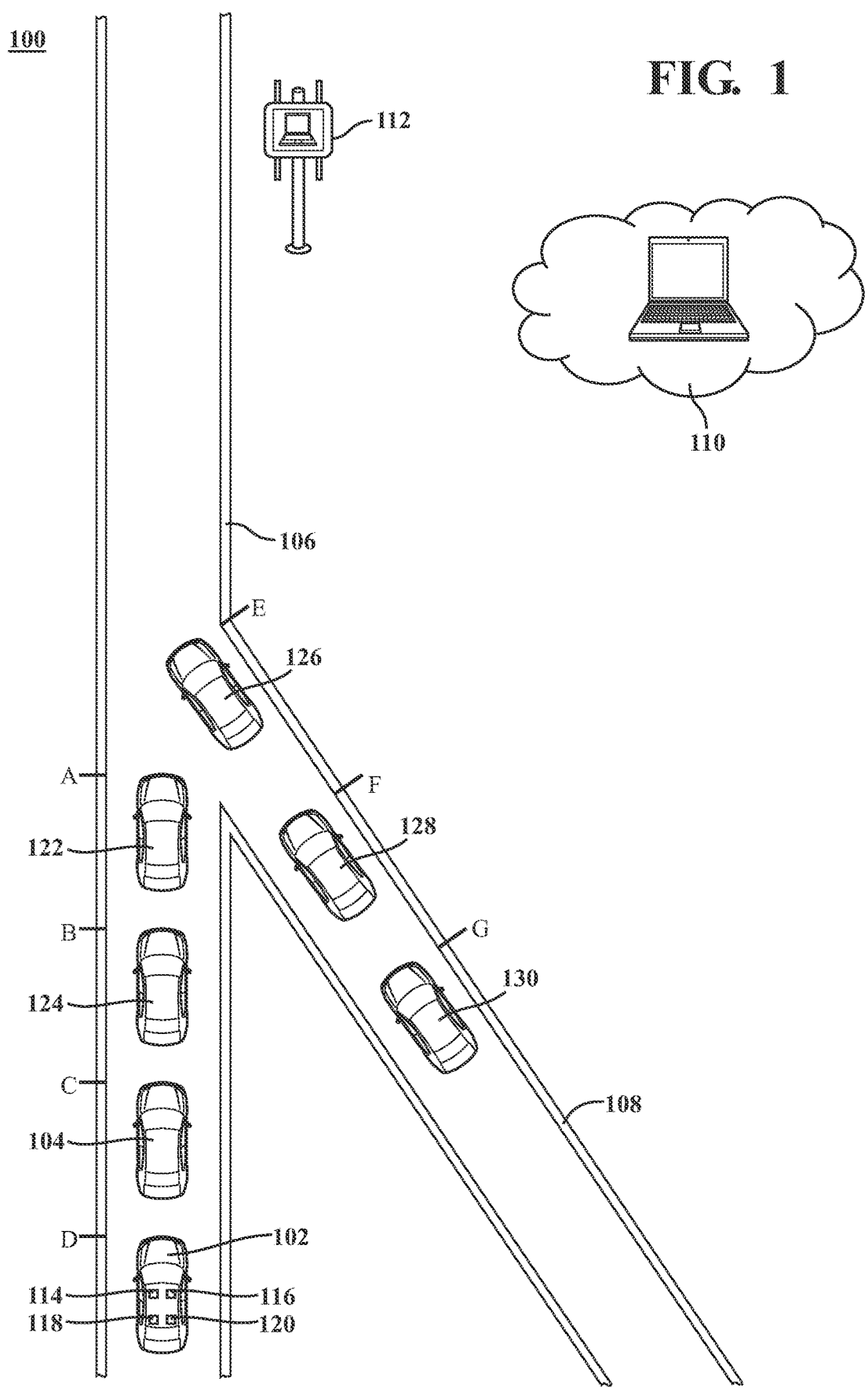
FIG. 1 includes a diagram that illustrates an example of an environment, at a first time, for maintaining a range of a gap between an ego vehicle and a preceding vehicle, according to the disclosed technologies.

Vehicles moving on a road can be referred to as being in traffic. Traffic on the road can be organized so that the vehicles usually move within lanes of the road. Within a specific lane, the vehicles can have a preferred speed of movement. Typically, the preferred speed can be determined by a traffic law or by a local custom. However, a circumstance can result in having a specific vehicle in traffic move at less than the preferred speed, which, in turn, can result in having one or more vehicles that are following the specific vehicle move at less than the preferred speed. The circumstance can be, for example, one or more of a traffic regulation signal (e.g., a traffic light, a toll gate, etc.), a traffic regulation sign (e.g., a change in maximum allowed speed, a yield sign, etc.), an intersection, an interchange, a change in a direction of the road (e.g., a bend), a change in a number of lanes designated for movement in a specific direction (e.g., such that a vehicle ahead of the specific vehicle changes lanes to be within the specific lane), an increase in a number of the vehicles within a specific length of the specific lane (e.g., such that the specific vehicle moves less than the preferred speed to safely operate in an environment in which a size of a gap between the specific vehicle and the vehicle ahead of the specific vehicle has been reduced), a deterioration of a surface of the road (e.g., a pothole), construction within the specific lane, debris within the specific lane, an obstacle within the specific lane, inclement weather (e.g., such that friction between the surface of the road and one or more tires of the specific vehicle is reduced, visibility in a vicinity of the specific vehicle is reduced, etc.), or the like.

For example, a sequence of vehicles in the specific lane can include the specific vehicle, a first other vehicle, and a second other vehicle. The first other vehicle can be directly following the specific vehicle. The second other vehicle can be directly following the first other vehicle.

The specific vehicle can encounter a circumstance originally affecting the specific vehicle. Such an encounter can result in having the specific vehicle initially decelerate. Later, in response to a determination that the circumstance originally affecting the specific vehicle is no longer an impediment to safely moving at a higher speed, the specific vehicle can accelerate.

However, having the specific vehicle decelerate can be, for the first other vehicle, a circumstance originally affecting the first other vehicle. The first other vehicle can encounter the circumstance originally affecting the first other vehicle. Such an encounter can result in having the first other vehicle initially decelerate. Later, in response to a determination that the circumstance originally affecting the first other vehicle is no longer an impediment to safely moving at the higher speed, the first other vehicle can accelerate. However, then the first other vehicle can encounter the circumstance originally affecting the specific vehicle. Such an encounter can result in having the first other vehicle again initially decelerate. Again, later, in response to a determination that the circumstance originally affecting the specific vehicle is no longer an impediment to safely moving at the higher speed, the first other vehicle can accelerate.

Likewise, having the first other vehicle decelerate can be, for the second other vehicle, a circumstance originally affecting the second other vehicle. The second other vehicle can encounter the circumstance originally affecting the second other vehicle. Such an encounter can result in having the second other vehicle initially decelerate. Later, in response to a determination that the circumstance originally affecting the second other vehicle is no longer an impediment to safely moving at the higher speed, the second other vehicle can accelerate. However, then the second other vehicle can encounter the circumstance originally affecting the first other vehicle. Such an encounter can result in having the second other vehicle again initially decelerate. Again, later, in response to a determination that the circumstance originally affecting the first vehicle is no longer an impediment to safely moving at the higher speed, the second other vehicle can accelerate. However, then the second other vehicle can encounter the circumstance originally affecting the specific vehicle. Such an encounter can result in having the second other vehicle yet again initially decelerate. Yet again, later, in response to a determination that the circumstance originally affecting the specific vehicle is no longer an impediment to safely moving at the higher speed, the second other vehicle can accelerate.

Such a phenomenon can be referred to as a traffic wave. A situation in which, within the traffic wave described above, one or more of: (1) the specific vehicle can stop after a deceleration, but before an acceleration in response to the circumstance originally affecting the specific vehicle, (2) the first other vehicle can stop after a deceleration, but before an acceleration in response to the circumstance originally affecting the first other vehicle, (3) the first other vehicle can stop after a deceleration, but before an acceleration in response to the circumstance originally affecting the specific vehicle, (4) the second other vehicle can stop after a deceleration, but before an acceleration in response to the circumstance originally affecting the second other vehicle, (5) the second other vehicle can stop after a deceleration, but before an acceleration in response to the circumstance originally affecting the first other vehicle, or (6) the second other vehicle can stop after a deceleration, but before an acceleration in response to the circumstance originally affecting the specific vehicle can be referred to as stop-and-go traffic. Additionally or alternatively, within the traffic wave, after the acceleration, but before the deceleration, a vehicle can move at a constant speed. Accordingly, a traffic wave can include a deceleration phase and an acceleration phase. Additionally, the traffic wave can include a stop phase. Additionally, or alternatively, the traffic wave can include a cruise phase (i.e., in which a vehicle can move at a constant speed).

In certain circumstances, a sequence of traffic waves, through which a vehicle moves, can be such that a measure of a length of a lane through which the vehicle moves during a first traffic wave, of the sequence of traffic waves, is within a threshold distance of a measure of the length of the lane through which the vehicle moves during a second traffic wave of the sequence of traffic waves. Likewise, a duration of time consumed as the vehicle moves through the first traffic wave can be within a threshold duration of a duration of time consumed as the vehicle moves through the second traffic wave. In such certain circumstances, each traffic wave, in the sequence of traffic waves, can be characterized as having a cycle with a cycle wavelength and a cycle period. Moreover, in such certain circumstances: (1) the deceleration phase can be characterized as having a deceleration wavelength and a deceleration period and (2) the acceleration phase can be characterized as having an acceleration wavelength and an acceleration period. Additionally, the stop phase can be characterized as having a stop period. Additionally or alternatively, the cruise phase can be characterized as having a cruise wavelength and a cruise period. A cycle of such a traffic wave in stop-and-go traffic can be referred to as a stop-and-go cycle.

A traffic wave can be undesirable for a variety of reasons. Such reasons can include, for example, one or more of an increase in wear of vehicle systems (e.g., a propulsion system, a braking system, a throttle system, a transmission system, an automotive battery, an alternator system, a cooling system, etc.), an increase in energy consumption (i.e., associated with decelerating and accelerating rather than moving at a constant speed), an increase in a likelihood of a collision, a decrease in the number of the vehicles capable of operating within the specific length of the specific lane, or the like.

The disclosed technologies are directed to maintaining a range of a gap between an ego vehicle and a preceding vehicle. A first time can be determined. The first time can be a time, during a deceleration phase of a stop-and-go cycle of the preceding vehicle, when a preceding vehicle speed will equal a desired speed of the ego vehicle. A determination can be made that the gap, at the first time, will be smaller than a desired maximum gap. An ego vehicle speed can be changed to correct the gap. Additionally or alternatively, a second time can be determined. The second time can be a time, during an acceleration phase of the stop-and-go cycle of the preceding vehicle, when the preceding vehicle speed will equal the desired speed of the ego vehicle. A determination can be made that the gap, at the second time, will be larger than a desired minimum gap. The ego vehicle speed can be changed to correct the gap. Operation of the disclosed technologies can strive to achieve a situation in which the ego vehicle speed is maintained at the desired speed so that the gap: (1) at the first time (during the deceleration phase of the stop-and-go cycle of the preceding vehicle), is equal to the desired maximum gap and (2) at the second time (during the acceleration phase of the stop-and-go cycle of the preceding vehicle), is equal to the desired minimum gap.

FIG. 1 includes a diagram that illustrates an example of an environment 100, at a first time, for maintaining a range of a gap between an ego vehicle 102 and a preceding vehicle 104, according to the disclosed technologies. For example, the environment 100 can include a road 106 and an on-ramp 108 of an interchange. For example, the environment 100 can include a cloud computing platform 110. For example, the environment 100 can include a roadside unit 112. For example, the ego vehicle 102 can include one or more of a communications device 114, one or more sensors 116, one or more vehicle systems 118, or a cruise control 120. For example, the environment 100 can include the ego vehicle 102, the preceding vehicle 104, a first other vehicle 122, a second other vehicle 124, a first merging vehicle 126, a second merging vehicle 128, and a third merging vehicle 130. For example, one or more of the ego vehicle 102, the preceding vehicle 104, the first other vehicle 122, the second other vehicle 124, the first merging vehicle 126, the second merging vehicle 128, or the third merging vehicle 130 can include "connected car" technologies to be a "connected car."

"Connected car" technologies can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

For example, at the first time, the first other vehicle 122 can be located on the road 106 at a point A upstream of the on-ramp 108. For example, at the first time, the second other vehicle 124 can be located on the road 106 at a point B upstream of the first other vehicle 122. For example, at the first time, the preceding vehicle 104 can be located on the road 106 at a point C upstream of the second other vehicle 124. For example, at the first time, the ego vehicle 102 can be located on the road 106 at a point D upstream of the preceding vehicle 104. For example, at the first time, the first merging vehicle 126 can be located on the on-ramp 108 at a point E, a point at which traffic on the on-ramp 108 merges with the road 106. For example, at the first time, the second merging vehicle 128 can be located on the on-ramp 108 at a point F upstream of the first merging vehicle 126. For example, at the first time, the third merging vehicle 130 can be located on the on-ramp 108 at a point G upstream of the second merging vehicle 128.

Having the first merging vehicle 126 merge, at the first time, from the on-ramp 108 to the road 106 can be a circumstance that affects the first other vehicle 122. An encounter with such a circumstance can result in having the first other vehicle 122 decelerate starting at the Point A. Having the first other vehicle 122 decelerate can be a circumstance that affects the second other vehicle 124. An encounter with such a circumstance can result in having the second other vehicle 124 decelerate starting at the Point B. Having the second other vehicle 124 decelerate can be a circumstance that affects the preceding vehicle 104. An encounter with such a circumstance can result in having the preceding vehicle 104 decelerate starting at the Point C. Such a start of a deceleration can be a start of a first stop-and-go cycle of the preceding vehicle 104.

Figure 2:
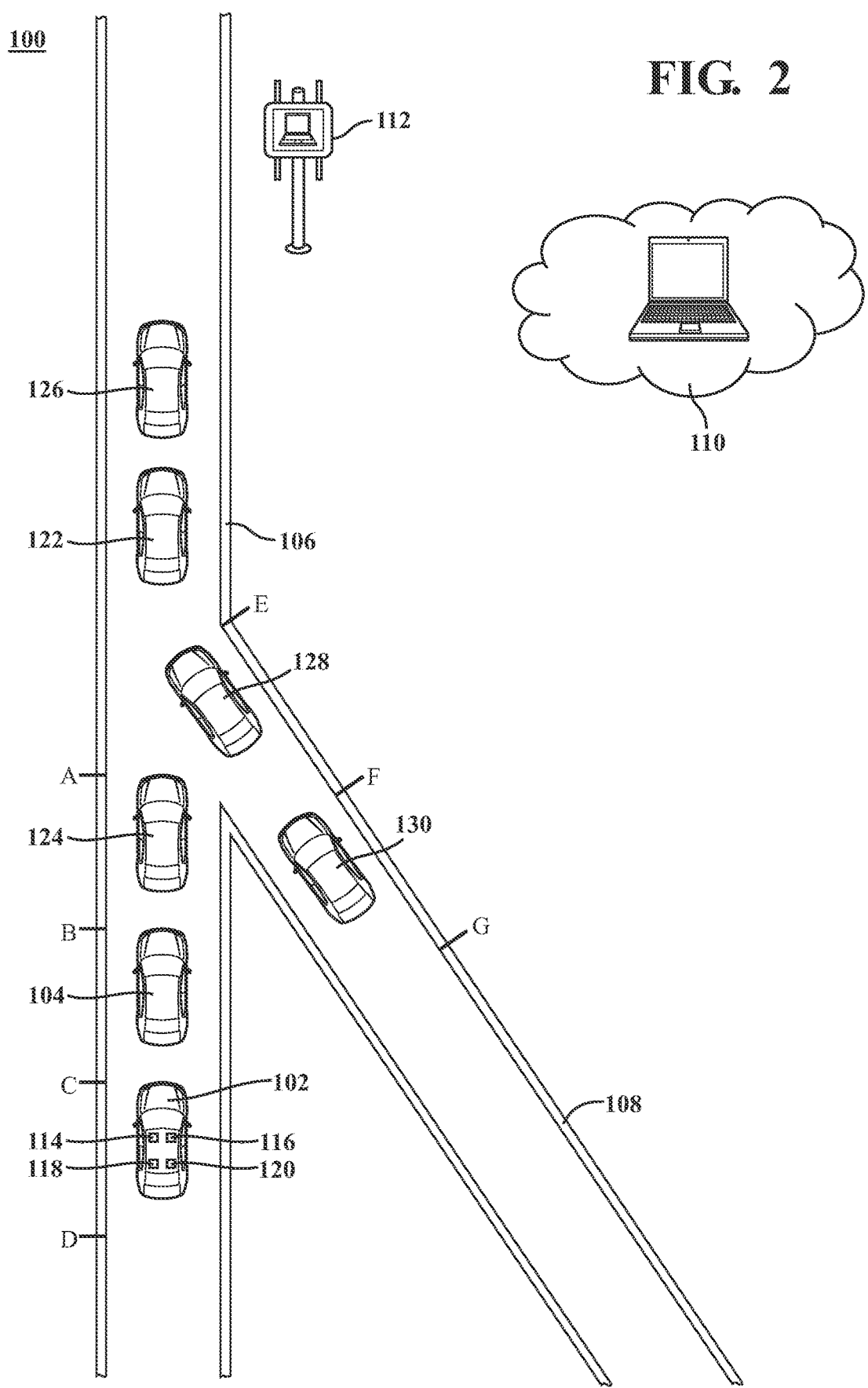
FIG. 2 includes a diagram that illustrates an example of the environment, at a second time, for maintaining the range of the gap between the ego vehicle and the preceding vehicle, according to the disclosed technologies.

FIG. 2 includes a diagram that illustrates an example of the environment 100, at a second time, for maintaining the range of the gap between the ego vehicle 102 and the preceding vehicle 104, according to the disclosed technologies. For example, at the second time, the first merging vehicle 126 can be located on the road 106 downstream of the point E. For example, at the second time, the first other vehicle 122 can be located on the road 106 upstream of the first merging vehicle 126, but downstream of the point E. For example, at the second time, the second other vehicle 124 can be located on the road 106 at the point A upstream of the on-ramp 108. For example, at the second time, the preceding vehicle 104 can be located on the road 106 at the point B upstream of the second other vehicle 124. For example, at the second time, the ego vehicle 102 can be located on the road 106 at the point C upstream of the preceding vehicle 104. For example, at the second time, the second merging vehicle 128 can be located on the on-ramp 108 at the point E, the point at which traffic on the on-ramp 108 merges with the road 106. For example, at the second time, the third merging vehicle 130 can be located on the on-ramp 108 at the point F upstream of the second merging vehicle 128.

Having the second merging vehicle 128 merge, at the second time, from the on-ramp 108 to the road 106 can be a circumstance that affects the second other vehicle 124. An encounter with such a circumstance can result in having the second other vehicle 124 decelerate starting at the Point A. Having the second other vehicle 124 decelerate can be a circumstance that affects the preceding vehicle 104. An encounter with such a circumstance can result in having the preceding vehicle 104 decelerate starting at the Point B. Such a start of a deceleration can be: (1) an end of the first stop-and-go cycle of the preceding vehicle 104 and (2) a start of a second stop-and-go cycle of the preceding vehicle 104.

Figure 3:
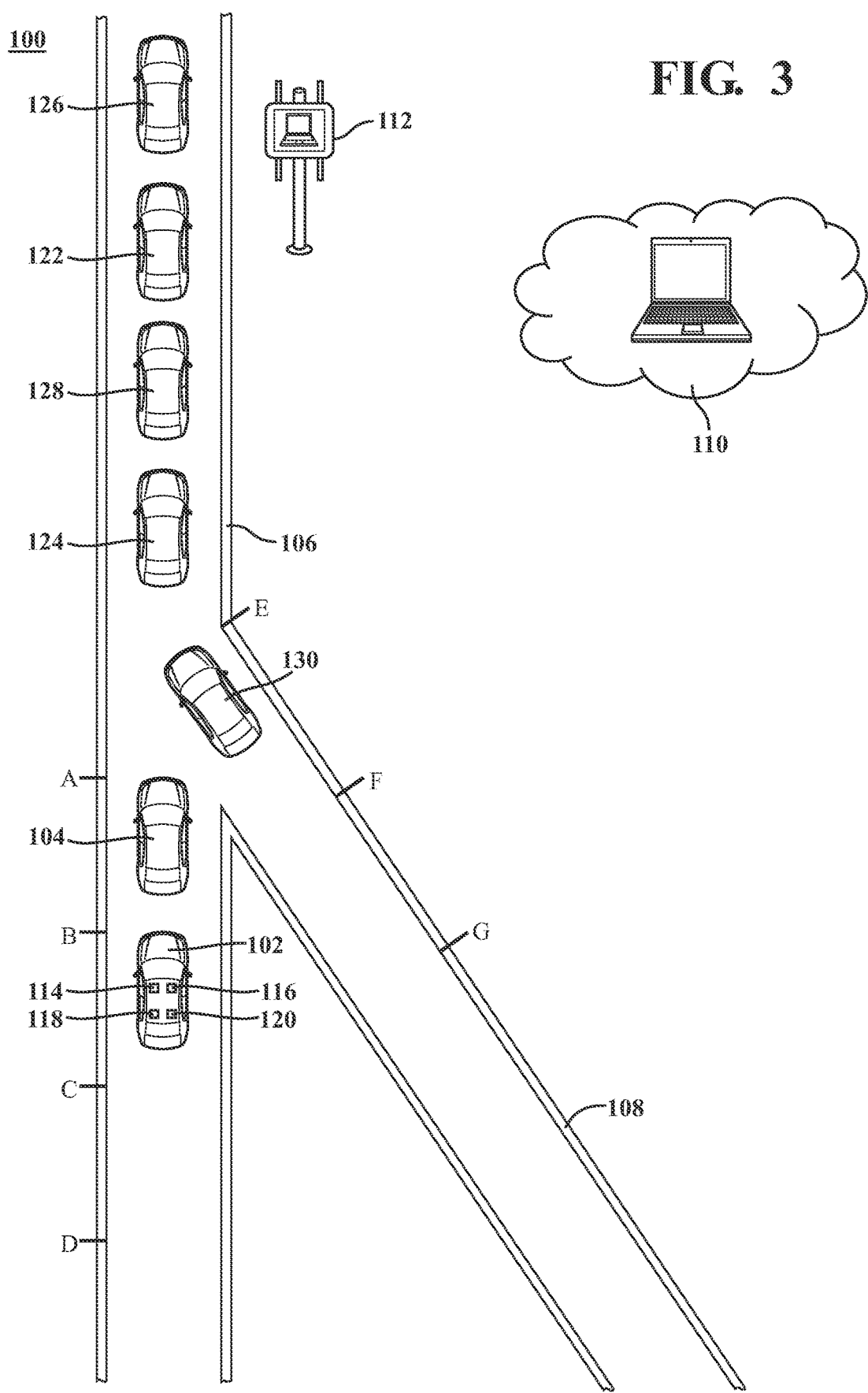
FIG. 3 includes a diagram that illustrates an example of the environment, at a third time, for maintaining the range of the gap between the ego vehicle and the preceding vehicle, according to the disclosed technologies.

FIG. 3 includes a diagram that illustrates an example of the environment 100, at a third time, for maintaining the range of the gap between the ego vehicle 102 and the preceding vehicle 104, according to the disclosed technologies. For example, at the third time, the first merging vehicle 126 can be located on the road 106 downstream of the point E. For example, at the third time, the first other vehicle 122 can be located on the road 106 upstream of the first merging vehicle 126, but downstream of the point E. For example, at the third time, the second merging vehicle 128 can be located on the road 106 upstream of the first other vehicle 122, but downstream of the point E. For example, at the third time, the second other vehicle 124 can be located on the road 106 upstream of the second merging vehicle 128, but downstream of the point E. For example, at the third time, the preceding vehicle 104 can be located on the road 106 at the point A upstream of the on-ramp 108. For example, at the third time, the ego vehicle 102 can be located on the road 106 at the point B upstream of the preceding vehicle 104. For example, at the third time, the third merging vehicle 130 can be located on the on-ramp 108 at the point E, the point at which traffic on the on-ramp 108 merges with the road 106.

Having the third merging vehicle 130 merge, at the third time, from the on-ramp 108 to the road 106 can be a circumstance that affects the preceding vehicle 104. An encounter with such a circumstance can result in having the preceding vehicle 104 decelerate starting at the Point A. Such a start of a deceleration can be an end of the second stop-and-go cycle of the preceding vehicle 104.

Figure 4:
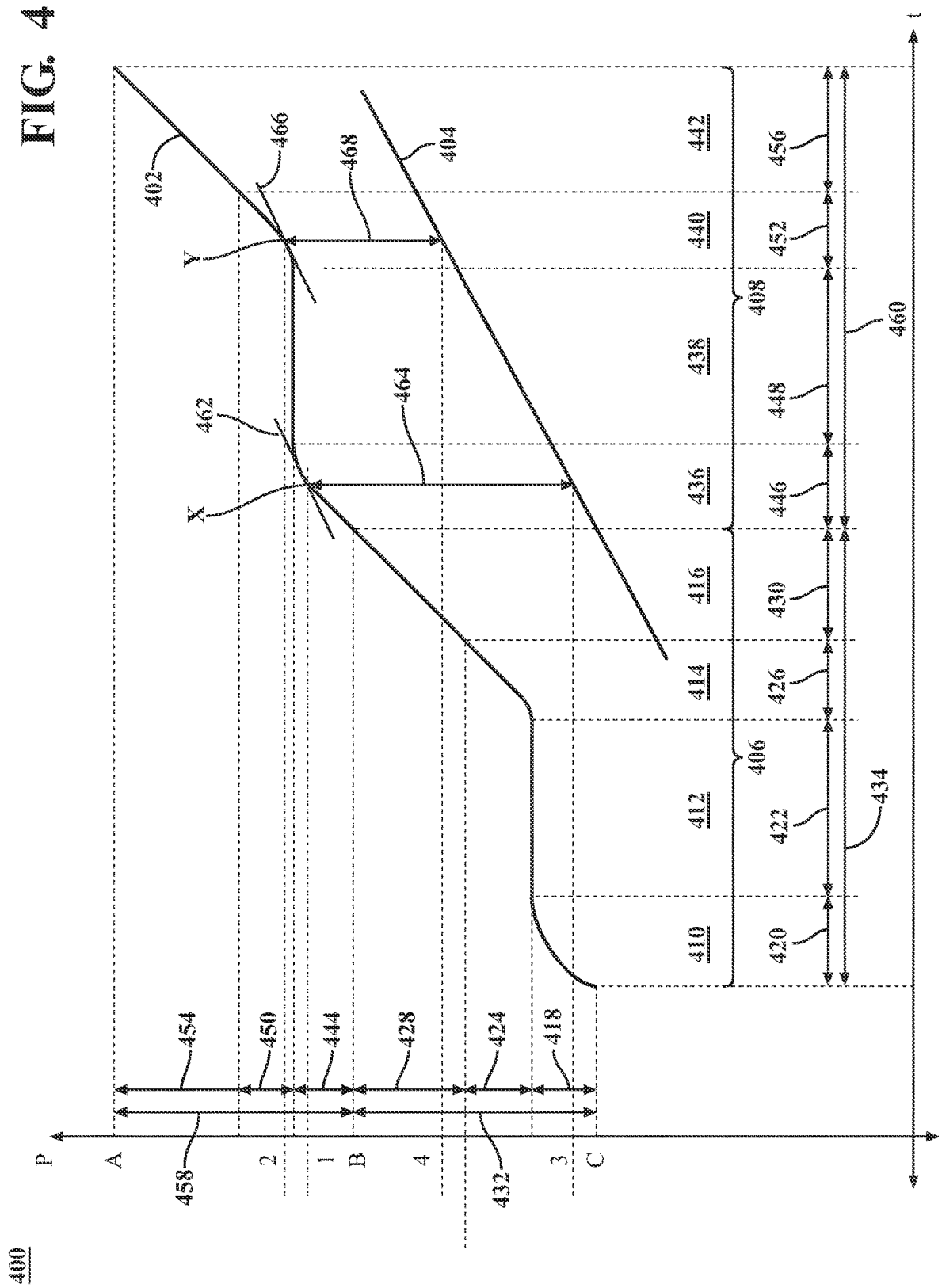
FIG. 4 are graphs of positions, versus time, of the preceding vehicle and the ego vehicle, according to an ideal implementation of the disclosed technologies.

FIG. 4 are graphs 400 of positions, versus time, of the preceding vehicle 104 and the ego vehicle 102, according to an ideal implementation of the disclosed technologies. The graphs 400 can include a graph 402 for the preceding vehicle 104 and a graph 404 for the ego vehicle 102.

The graph 402 can be characterized as having a first stop-and-go cycle 406 and a second stop-and-go cycle 408. The first stop-and-go cycle 406 can have a first deceleration phase 410, a first stop phase 412, a first acceleration phase 414, and a first cruise phase 416. The first deceleration phase 410 can be characterized as having a first deceleration wavelength 418 and a first deceleration period 420. The first stop phase 412 can be characterized as having a first stop period 422. The first acceleration phase 414 can be characterized as having a first acceleration wavelength 424 and a first acceleration period 426. The first cruise phase 416 can be characterized as having a first cruise wavelength 428 and a first cruise period 430. The first stop-and-go cycle 406 can be characterized as having a first stop-and-go cycle wavelength 432 and a first stop-and-go cycle period 434. The first stop-and-go cycle wavelength 432 can be a sum of the first deceleration wavelength 418 added to the first acceleration wavelength 424 added to the first cruise wavelength 428. The first stop-and-go cycle period 434 can be a sum of the first deceleration period 420 added to the first stop period 422 added to the first acceleration period 426 added to the first cruise period 430. The second stop-and-go cycle 408 can have a second deceleration phase 436, a second stop phase 438, a second acceleration phase 440, and a second cruise phase 442. The second deceleration phase 436 can be characterized as having a second deceleration wavelength 444 and a second deceleration period 446. The second stop phase 438 can be characterized as having a second stop period 448. The second acceleration phase 440 can be characterized as having a second acceleration wavelength 450 and a second acceleration period 452. The second cruise phase 442 can be characterized as having a second cruise wavelength 454 and a second cruise period 456. The second stop-and-go cycle 408 can be characterized as having a second stop-and-go cycle wavelength 458 and a second stop-and-go cycle period 460. The second stop-and-go cycle wavelength 458 can be a sum of the second deceleration wavelength 444 added to the second acceleration wavelength 450 added to the second cruise wavelength 454. The second stop-and-go cycle period 460 can be a sum of the second deceleration period 446 added to the second stop period 448 added to the second acceleration period 452 added to the second cruise period 456.

The graph 404 can be characterized as being a line that represents that the position, versus time, of the ego vehicle 102 changes at a constant desired speed.

A line 462 can intersect the graph 402 at a tangent Point X within the second deceleration phase 436 and can be parallel to the graph 404. A time associated with the tangent Point X can be a time at which a gap between the ego vehicle 102 and the preceding vehicle 104 is equal to a desired maximum gap 464.

A line 466 can intersect the graph 402 at a tangent Point Y within the second acceleration phase 440 and can be parallel to the graph 404. A time associated with the tangent Point Y can be a time at which a gap between the ego vehicle 102 and the preceding vehicle 104 is equal to a desired minimum gap 468.

A Position 1 can be a position associated with the tangent Point X. A Position 2 can be a position associated with the tangent Point Y. A Position 3 can be a position associated with a point on the graph 404 that is associated with a same time as the time associated with the tangent Point X. A Position 4 can be a position associated with a point on the graph 404 that is associated with a same time as the time associated with the tangent Point Y.

Figure 5:
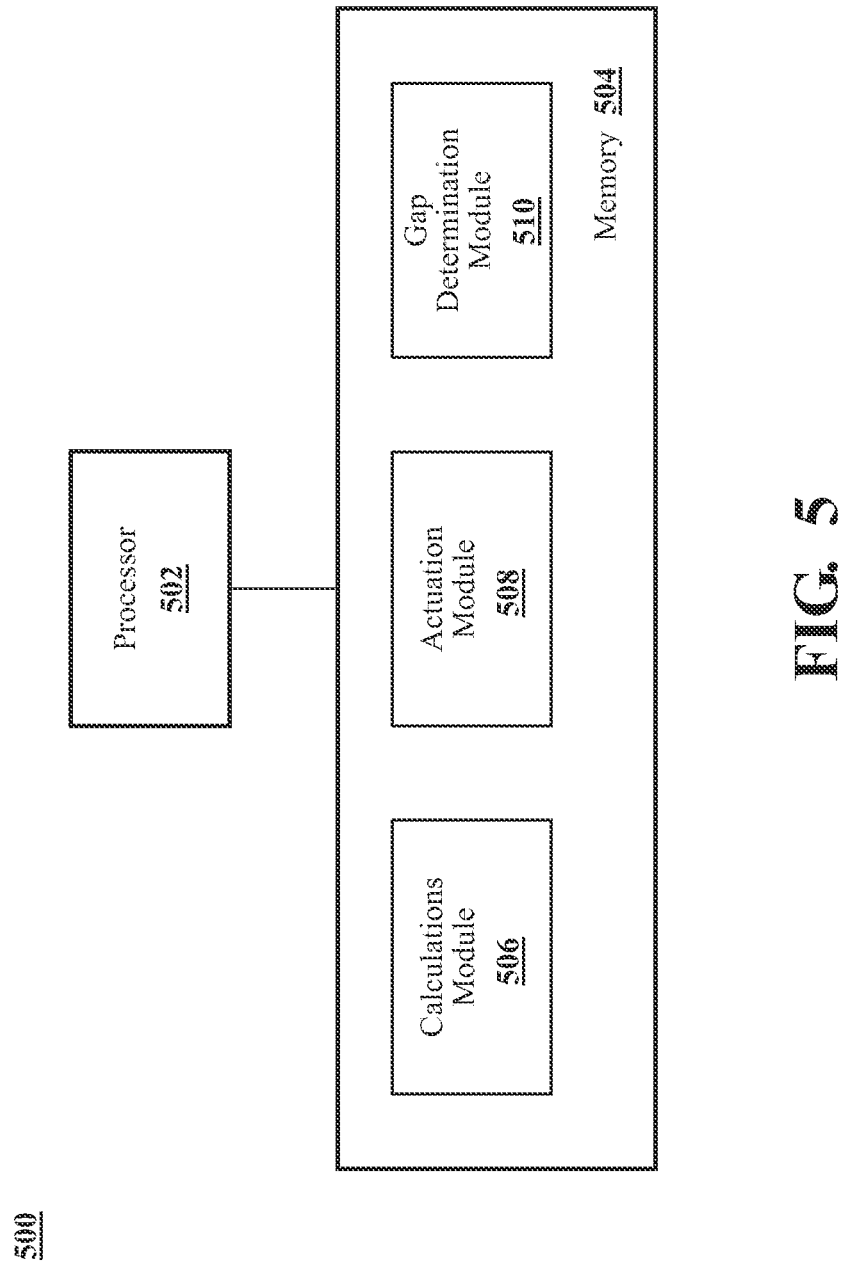
FIG. 5 includes a block diagram that illustrates an example of a system for maintaining a range of a gap between an ego vehicle and a preceding vehicle, according to the disclosed technologies.

FIG. 5 includes a block diagram that illustrates an example of a system 500 for maintaining a range of a gap between an ego vehicle and a preceding vehicle, according to the disclosed technologies. The system 500 can include, for example, a processor 502 and a memory 504. The memory 504 can be communicably coupled to the processor 502. For example, the memory 504 can store a calculations module 506 and an actuation module 508. For example, the system 500 can be disposed on an ego vehicle. For example, the ego vehicle can be the ego vehicle 102 illustrated in FIG. 1.

For example, the calculations module 506 can include instructions that function to control the processor 502 to determine a first time. The first time can be a time, during a deceleration phase of a stop-and-go cycle of the preceding vehicle, when a preceding vehicle speed will equal a desired speed of the ego vehicle. For example, the calculations module 506 can include instructions that function to control the processor 502 to determine that the gap, at the first time, will be smaller than a desired maximum gap. For example, the actuation module 508 can include instructions that function to control the processor 502 to change an ego vehicle speed to correct the gap.

Additionally or alternatively, for example, the calculations module 506 can include instructions that function to control the processor 502 to determine a second time. The second time can be a time, during an acceleration phase of the stop-and-go cycle of the preceding vehicle, when the preceding vehicle speed will equal the desired speed of the ego vehicle. For example, the calculations module 506 can include instructions that function to control the processor 502 to determine that the gap, at the second time, will be larger than a desired minimum gap. For example, the actuation module 508 can include instructions that function to control the processor 502 to change an ego vehicle speed to correct the gap.

For example, the stop-and-go cycle can include the deceleration phase, a stop phase, the acceleration phase, and a cruise phase. For example, the deceleration phase can be defined by a first duration of time. The first duration of time can be a duration of time during which the preceding vehicle is decelerating. For example, the stop phase can be defined by a second duration of time. The second duration of time can be a duration of time during which the preceding vehicle is stopped. For example, the acceleration phase can be defined by a third duration of time. The third duration of time can be a duration of time during which the preceding vehicle is accelerating. For example, the cruise phase can be defined by a fourth duration of time. The fourth duration of time can be a duration of time during which the preceding vehicle speed is positive and constant.

For example, the calculations module 506 can further include instructions that function to control the processor 502 to obtain a measure of a period of the stop-and-go cycle.

For example, the instructions to obtain the measure of the period of the stop-and-go cycle can include instructions to execute a first technique. The first technique can include instructions to receive, from a first information source, the measure of the period of the stop-and-go cycle.

Additionally or alternatively, for example, the instructions to obtain the measure of the period of the stop-and-go cycle can include instructions to execute a second technique. The second technique can including instructions to: (1) receive, from a second information source, information related to the stop-and-go cycle and (2) determine, using the information, the measure of the period of the stop-and-go cycle.

For example, one or more of the first information source or the second information source can include one or more of: (1) a cloud-based server of a traffic monitoring system, (2) a roadside unit, (3) one or more other vehicles, or (4) one or more sensors of the ego vehicle. With reference to FIG. 1, for example: (1) the cloud-based server of the traffic monitoring system can be the cloud computing platform 110, (2) the roadside unit can be the roadside unit 112, (3) the one or more other vehicles can be one or more of the preceding vehicle 104, the first other vehicle 122, the second other vehicle 124, the first merging vehicle 126, the second merging vehicle 128, or the third merging vehicle 130, which can communicate with the ego vehicle 102 via the communications device 114, or (4) the one or more sensors of the ego vehicle can be the one or more sensors 116 of the ego vehicle 102.

For example, the one or more sensors can include one or more of a ranging sensor or an imaging sensor. For example, the ranging sensor can include one or more of a radar device, a lidar device, an ultrasonic ranging device, an infrared ranging device, or the like. For example, the imaging sensor can include one or more of a camera, an ultrasonic imaging device, an infrared imaging device, or the like. For example, the camera can include one or more of a color camera, a stereoscopic camera, a video camera, a digital video camera, or the like.

Returning to FIG. 5, for example, the instructions to change the ego vehicle speed can include instructions to cause a signal to be sent to one or more vehicle systems, of the ego vehicle, to cause the ego vehicle speed to change. With reference to FIG. 1, for example, the one or more vehicle systems of the ego vehicle can be the one or more vehicle systems 118 of the ego vehicle 102.

Returning to FIG. 5, additionally or alternatively, for example, the instructions to change the ego vehicle speed can include instructions to cause a cruise control system, of the ego vehicle, to operate to change the ego vehicle speed.

For example, the cruise control system can include an adaptive cruise control system. With reference to FIG. 1, for example, the cruise control system of the ego vehicle can be the cruise control system 120 of the ego vehicle 102.

For example, the cruise control system can be configured to optimize a model to maintain the range of the gap and the instructions to change the ego vehicle speed can include one or more of instructions to change at least one term in the model, instructions to add at least one term to the model, or instructions to remove at least one term from the model.

For example, the model can include an expression for an ego vehicle acceleration (a).

For example, the expression for the ego vehicle acceleration (a) can include a first term. The first term can include, in response to a current gap (s) between the ego vehicle and the preceding vehicle being less than the desired minimum gap ($s_{min}$), a product of a first gain ($k_1$) multiplied by a first difference. The first difference can be the desired minimum gap ($s_{min}$) subtracted from the current gap (s):

$$a=(k_1)(s-s_{min}), \text{ if } s<s_{min}$$

For example, the expression for the ego vehicle acceleration (a) can include a second term. The second term can include, in response to the current gap (s) being greater than the desired maximum gap ($s_{max}$), a product of a second gain ($k_2$) multiplied by a second difference. The second difference can be the desired maximum gap ($s_{max}$) subtracted from the current gap (s):

$$a=(k_2)(s-s_{max}), \text{ if } s>s_{max}$$

For example, the expression for the ego vehicle acceleration can include a third term. The third term can include a product of a third gain ($k_3$) multiplied by a third difference. The third difference can be the ego vehicle speed (v) subtracted from the desired speed ($v_d$):

$$a=(k_3)(v_d-v)$$

In a first implementation, the instructions to change the ego vehicle speed can include instructions to add a term to the expression for the ego vehicle acceleration (a). For example, the term, added to the expression for the ego vehicle acceleration (a), can include a product of a gain multiplied by a difference. For example, in response to the time, when the preceding vehicle speed ($v_{i-1}$) will equal the desired speed ($v_d$), being the first time (during the deceleration phase): (1) the gain can be a fifth gain ($k_5$) and (2) the difference can be the desired maximum gap ($s_{max}$) subtracted from a current gap between the ego vehicle and the preceding vehicle (s). Additionally or alternatively, for example, in response to the time, when the preceding vehicle speed ($v_{i-1}$) will equal the desired speed ($v_d$), being the second time (during the acceleration phase): (1) the gain can be a sixth gain ($k_6$) and (2) the difference can be the desired minimum gap ($s_{min}$) subtracted from the current gap (s).

For example, the instructions to add the term to the expression for the ego vehicle acceleration (a) can include instructions to add, in response to an existence of a condition, the term to the expression for the ego vehicle acceleration (a). For example, the condition can include: (1) an absolute value of a difference of the desired speed ($v_d$) subtracted from the preceding vehicle speed ($v_{i-1}$) being less than a threshold (ε) and (2) in response to the time, when the preceding vehicle speed ($v_{i-1}$) will equal the desired speed ($v_d$), being the first time (during the deceleration phase), a preceding vehicle acceleration ($a_{i-1}$) being negative. Additionally or alternatively, for example, the condition can include: (1) the absolute value of the difference of the desired speed ($v_d$) subtracted from the preceding vehicle speed ($v_{i-1}$) being less than the threshold ($\varepsilon$) and (2) in response to the time, when the preceding vehicle speed ($v_{i-1}$) will equal the desired speed ($v_d$), being the second time (during the acceleration phase), the preceding vehicle acceleration ($a_{i-1}$) being positive:

$$a=(k_4)(s-s_{max}), \text{ if } |v_{i-1}-v_d|<\varepsilon \text{ and } a_{i-1}<0$$

$$a=(k_5)(s-s_{min}), \text{ if } |v_{i-1}-v_d|<\varepsilon \text{ and } a_{i-1}>0$$

Figure 6:
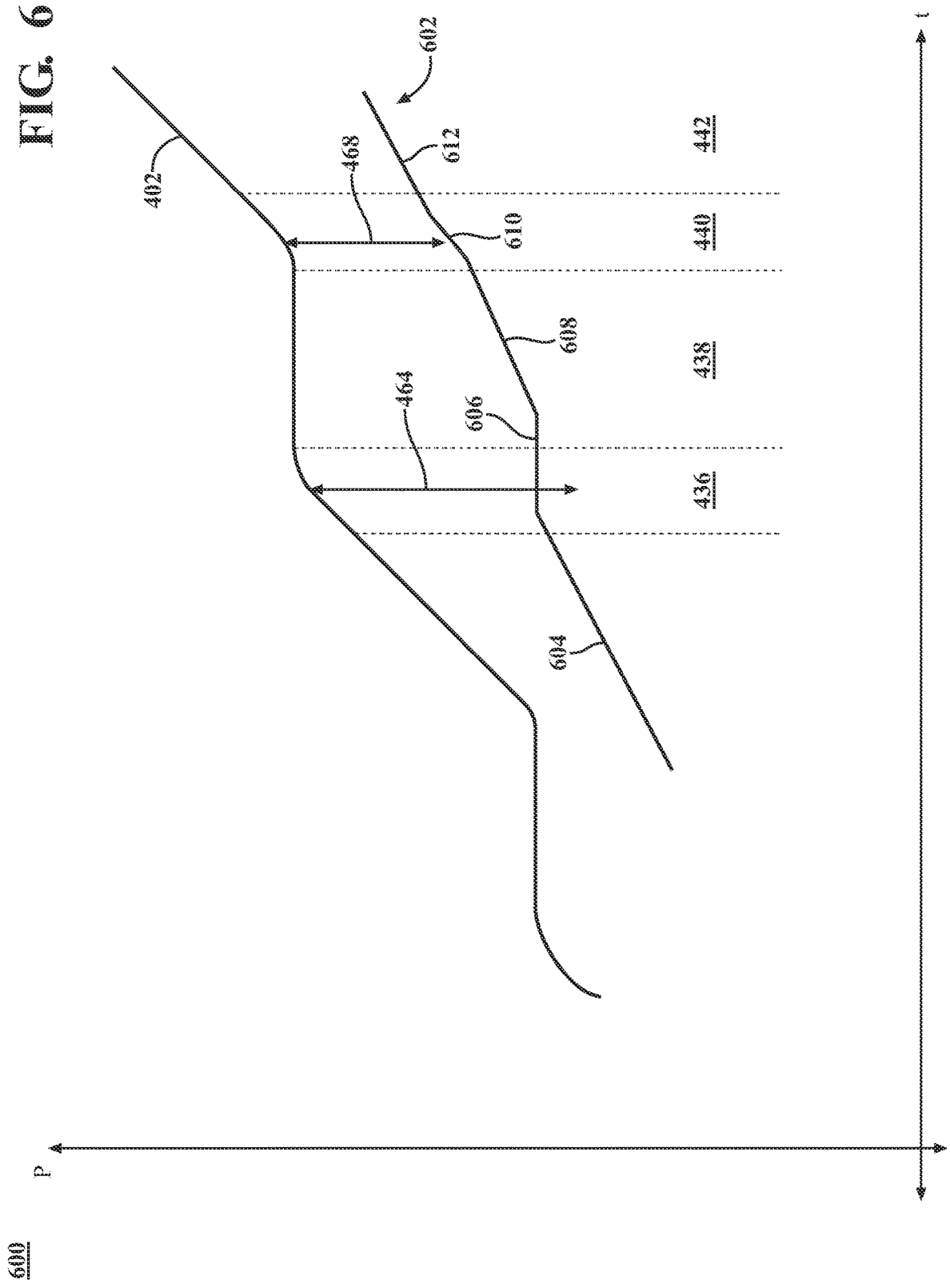
FIG. 6 are graphs of positions, versus time, of the preceding vehicle and the ego vehicle 102, according to a first implementation of the disclosed technologies.

FIG. 6 are graphs 600 of positions, versus time, of the preceding vehicle 104 and the ego vehicle 102, according to the first implementation of the disclosed technologies. The graphs 600 can include the graph 402 for the preceding vehicle 104 and a graph 602 for the ego vehicle 102. The graph 602 can be characterized as a sequence of line segments: a first segment 604, a second segment 606, a third segment 608, a fourth segment 610, and a fifth segment 612. For example, each of the first segment 604, the third segment 608, and the fifth segment 612 can represent that the position, versus time, of the ego vehicle changes at the constant desired speed ($v_d$).

The second segment 606 can represent a change in the position, versus time, of the ego vehicle (i.e., the ego vehicle speed (v)) in response to an operation of the cruise control system to optimize the model that includes the expression for the ego vehicle acceleration (a) that includes the term added to the expression in response to the time, when the preceding vehicle speed ($v_{i-1}$) will equal the desired speed ($v_d$), being the first time (during the deceleration phase) and a determination that the gap (s), at the first time, will be smaller than the desired maximum gap ($s_{max}$). Because the model can include this term in response to: (1) the absolute value of the difference of the desired speed ($v_d$) subtracted from the preceding vehicle speed ($v_{i-1}$) being less than the threshold ($\varepsilon$) and (2) the preceding vehicle acceleration ($a_{i-1}$) being negative, an initial point of the second segment 606 can occur at a time after a start of the second deceleration phase 436.

The fourth segment 610 can represent a change in the position, versus time, of the ego vehicle (i.e., the ego vehicle speed (v)) in response to an operation of the cruise control system to optimize the model that includes the expression for the ego vehicle acceleration (a) that includes the term added to the expression in response to the time, when the preceding vehicle speed ($v_{i-1}$) will equal the desired speed ($v_d$), being the second time (during the acceleration phase) and a determination that the gap (s), at the second time, will be larger than the desired minimum gap ($s_{min}$). Because the model can include this term in response to: (1) the absolute value of the difference of the desired speed ($v_d$) subtracted from the preceding vehicle speed ($v_{i-1}$) being less than the threshold ($\varepsilon$) and (2) the preceding vehicle acceleration ($a_{i-1}$) being positive, an initial point of the fourth segment 610 can occur at a time after a start of the second acceleration phase 440.

Returning to FIG. 5, additionally or alternatively, in a second implementation, the instructions to change the ego vehicle speed can include instructions to change a term of the expression for the ego vehicle acceleration (a). For example, the term of the expression for the ego vehicle acceleration can include a product of a gain multiplied by a first difference. The first difference can be the ego vehicle speed (v) subtracted from the desired speed ($v_d$). For example, the instructions to change the term of the expression for the ego vehicle acceleration can include instructions to change, in response to an existence of a condition, the desired speed ($v_d$) to a modified desired speed ($v_{mod}$). Change:

from $a=(k_3)(v_d-v)$ to $a=(k_3)(v_{mod}-v)$

For example, the condition can include a current time being between: (1) the time when the preceding vehicle speed ($v_{i-1}$) will equal the desired speed ($v_d$) (e.g., the first time or the second time) and (2) a desired time ($t_{desired}$).

For example, the modified desired speed ($v_{mod}$) can be a sum of the desired speed ($v_d$) added to a ratio. For example, the ratio can be a quotient of a second difference divided by a duration of time ($\Delta t$). For example, the duration of time ($\Delta t$) can be between: (1) the time when the preceding vehicle speed ($v_{i-1}$) will equal the desired speed ($v_d$) (e.g., the first time or the second time) and (2) the desired time ($t_{desired}$). For example, the second difference can be, in response to the time, when the preceding vehicle speed ($v_{i-1}$) will equal the desired speed ($v_d$), being the first time (during the deceleration phase), the desired maximum gap ($s_{max}$) subtracted from a current gap between the ego vehicle and the preceding vehicle (s). Additionally or alternatively, the second difference can be, in response to the time, when the preceding vehicle speed ($v_{i-1}$) will equal the desired speed ($v_d$), being the second time (during the acceleration phase), the desired minimum gap ($s_{min}$) subtracted from the current gap (s):

$$v_{mod}=v_d+[(s-s_{max})/\Delta t], \text{ if } a_{i-1}<0$$

$$v_{mod}=v_d+[(s-s_{min})/\Delta t], \text{ if } a_{i-1}>0$$

For example, the duration of time ($\Delta t$) can be equal to a period of the stop-and-go cycle. With reference to FIG. 4, for example, the duration of time ($\Delta t$) can be equal to the second stop-and-go cycle period 460.

Figure 7:
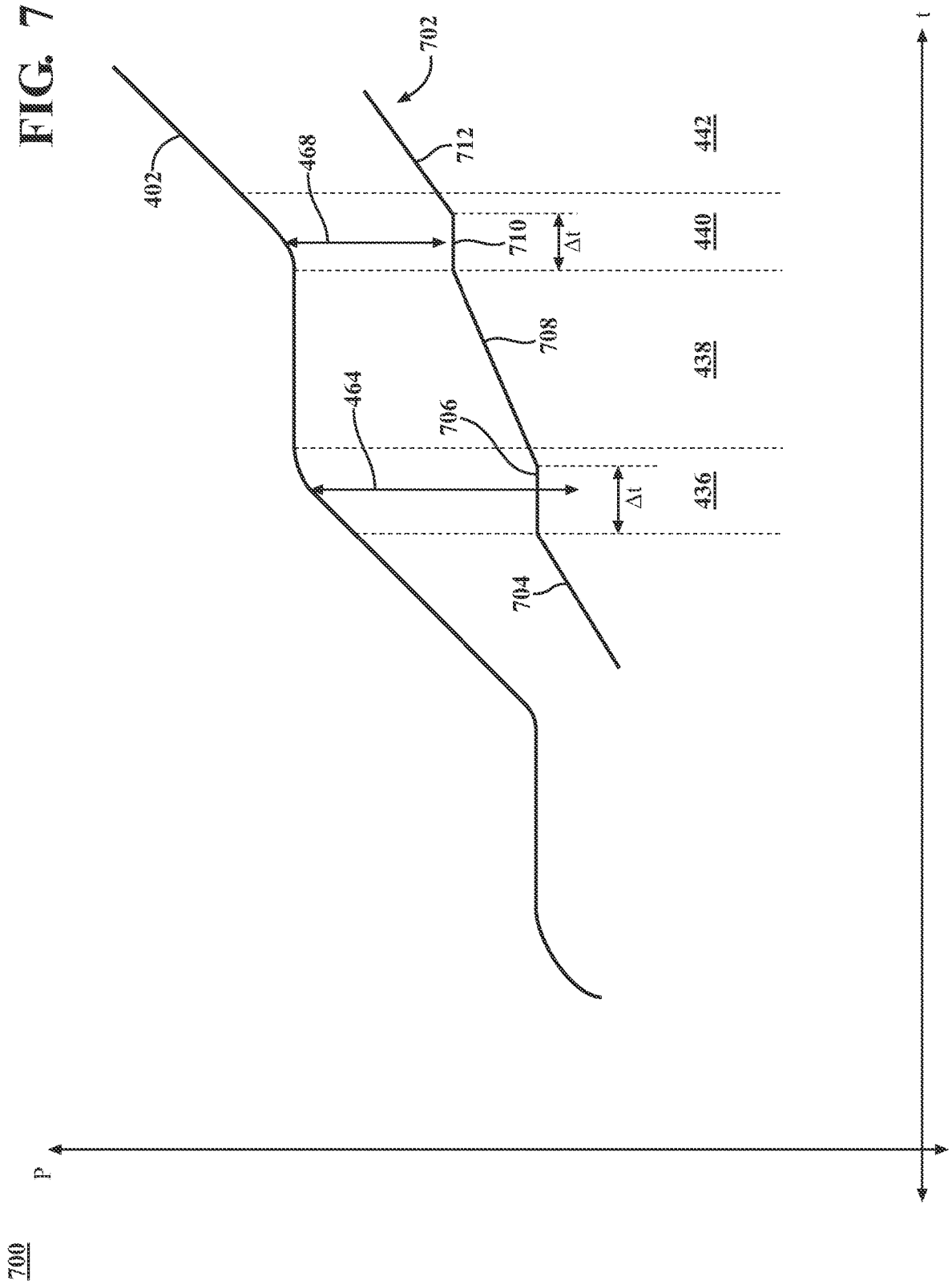
FIG. 7 are graphs of positions, versus time, of the preceding vehicle and the ego vehicle, according to a second implementation of the disclosed technologies.

FIG. 7 are graphs 700 of positions, versus time, of the preceding vehicle 104 and the ego vehicle 102, according to the second implementation of the disclosed technologies. The graphs 700 can include the graph 402 for the preceding vehicle 104 and a graph 702 for the ego vehicle 102. The graph 702 can be characterized as a sequence of line segments: a first segment 704, a second segment 706, a third segment 708, a fourth segment 710, and a fifth segment 712. For example, each of the first segment 704, the third segment 708, and the fifth segment 712 can represent that the position, versus time, of the ego vehicle changes at the constant desired speed ($v_d$).

The second segment 706 can represent a change in the position, versus time, of the ego vehicle (i.e., the ego vehicle speed (v)) in response to an operation of the cruise control system to optimize the model that includes the expression for the ego vehicle acceleration (a) that includes the term changed in response to the time, when the preceding vehicle speed ($v_{i-1}$) will equal the desired speed ($v_d$), being the first time (during the deceleration phase) and a determination that the gap (s), at the first time, will be smaller than the desired maximum gap ($s_{max}$). An initial point of the second segment 706 can occur at a start of the second deceleration phase 436 and an end point of the second segment 706 can occur at a time that is the duration of time ($\Delta t$) after the start of the second deceleration phase 436.

The fourth segment 710 can represent a change in the position, versus time, of the ego vehicle (i.e., the ego vehicle speed (v)) in response to an operation of the cruise control system to optimize the model that includes the expression for the ego vehicle acceleration (a) that includes the term changed in response to the time, when the preceding vehicle speed ($v_{i-1}$) will equal the desired speed ($v_d$), being the second time (during the acceleration phase) and a determination that the gap (s), at the second time, will be larger than the desired minimum gap ($s_{min}$). An initial point of the fourth segment 710 can occur at a start of the second acceleration phase 440 and an end point of the fourth segment 710 can occur at a time that is the duration of time ($\Delta t$) after the start of the second acceleration phase 440.

Returning to FIG. 5, additionally, for example, the memory 504 can further store a gap determination module 510. The gap determination module 510 can include instructions that function to control the processor 502 to determine the desired maximum gap ($s_{max}$). For example, the instructions to determine the desired maximum gap ($s_{max}$) can include instructions to add the desired minimum gap ($s_{min}$) to a first difference.

For example, the time, when the preceding vehicle speed ($v_{i-1}$) will equal the desired speed ($v_d$), can include the first time and the second time. For example, the first time can be during the deceleration phase. For example, the second time can be during the acceleration phase. For example: (1) a first position can be a position of the preceding vehicle at the first time, (2) a second position can be a position of the preceding vehicle at the second time, (3) a third position can be a position of the ego vehicle at the first time, and (4) a fourth position can be a position of the ego vehicle at the second time. For example, the first difference can be a second difference subtracted from a third distance. For example, the second difference can be the third position subtracted from the fourth position. For example, the third difference can be the first position subtracted from the second position. With reference to FIG. 4, for example: (1) the first position can be the Position 1, (2) the second position can be the Position 2, (3) the third position can be the Position 3, and (4) the fourth position can be the Position 4.

For example, the first difference can be a first term subtracted from a second term. For example, the first term can be the desired speed ($v_d$) multiplied by a duration of time ($\Delta t_{calc}$). For example, the duration of time ($\Delta t_{calc}$) can be between the first time and the second time. For example, a maximum value of the second term can be a distance traversed by the preceding vehicle during a single iteration of the stop-and-go cycle. For example, the maximum value of the second term can be the second stop-and-go cycle wavelength 458.

For example, the minimum desired gap ($s_{min}$) can be a sum of a constant added to a product. For example, the product can be the desired speed ($v_d$) multiplied by a duration of time ($\Delta t_{min}$). For example, the duration of time ($\Delta t_{min}$) can be between a first snapshot time and a second snapshot time. For example, the first snapshot time can be a time at which the preceding vehicle passes a point. For example, the second snapshot time can be a time at which the ego vehicle, moving at the desired speed ($v_d$), passes the point. For example, the constant can be a maximum allowed gap, between two vehicles, during a stop phase of a stop-and-go cycle of the two vehicles. For example, the constant can be two meters.

Figure 8:
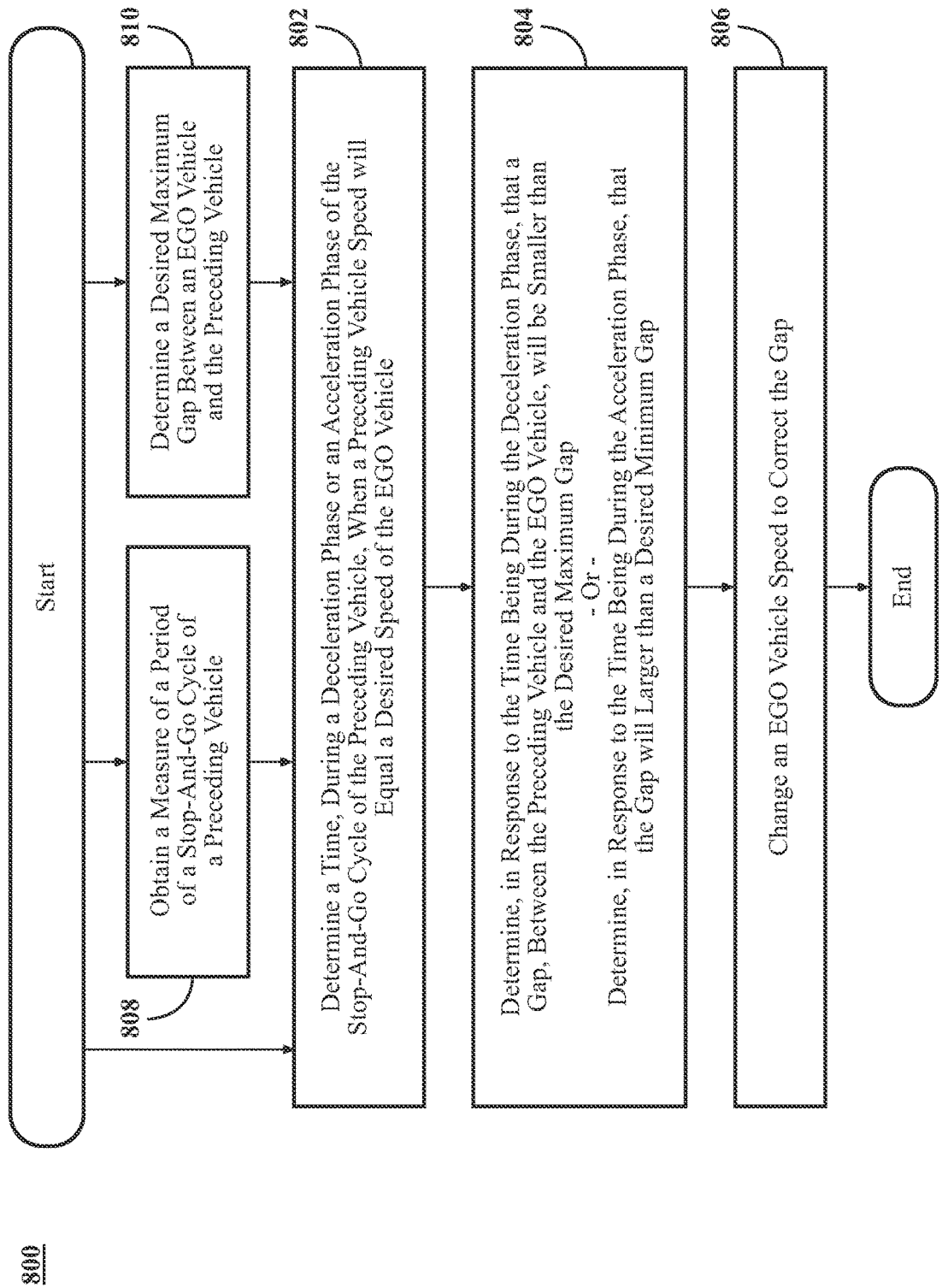
FIG. 8 includes a flow diagram that illustrates an example of a method that is associated with maintaining a range of a gap between an ego vehicle and a preceding vehicle, according to the disclosed technologies.

FIG. 8 includes a flow diagram that illustrates an example of a method 800 that is associated with maintaining a range of a gap between an ego vehicle and a preceding vehicle, according to the disclosed technologies. Although the method 800 is described in combination with the system 500 illustrated in FIG. 5, one of skill in the art understands, in light of the description herein, that the method 800 is not limited to being implemented by the system 500 illustrated in FIG. 5. Rather, the system 500 illustrated in FIG. 5 is an example of a system that may be used to implement the method 800. Additionally, although the method 800 is illustrated as a generally serial process, various aspects of the method 800 may be able to be executed in parallel.

In FIG. 8, in the method 800, at an operation 802, for example, the calculations module 506 can determine a first time. The first time can be a time, during a deceleration phase of a stop-and-go cycle of the preceding vehicle, when a preceding vehicle speed will equal a desired speed of the ego vehicle. Additionally or alternatively, at the operation 802, for example, the calculations module 506 can determine a second time. The second time can be a time, during an acceleration phase of the stop-and-go cycle of the preceding vehicle, when the preceding vehicle speed will equal the desired speed of the ego vehicle.

For example, the stop-and-go cycle can include the deceleration phase, a stop phase, the acceleration phase, and a cruise phase. For example, the deceleration phase can be defined by a first duration of time. The first duration of time can be a duration of time during which the preceding vehicle is decelerating. For example, the stop phase can be defined by a second duration of time. The second duration of time can be a duration of time during which the preceding vehicle is stopped. For example, the acceleration phase can be defined by a third duration of time. The third duration of time can be a duration of time during which the preceding vehicle is accelerating. For example, the cruise phase can be defined by a fourth duration of time. The fourth duration of time can be a duration of time during which the preceding vehicle speed is positive and constant.

At an operation 804, for example, the calculations module 506 can determine that the gap, at the first time, will be smaller than a desired maximum gap. Additionally or alternatively, at the operation 804, for example, the calculations module 506 can determine that the gap, at the second time, will be larger than a desired minimum gap.

At an operation 806, for example, the actuation module 508 can change an ego vehicle speed to correct the gap.

At the operation 806, for example, the actuation module 508 can cause a signal to be sent to one or more vehicle systems, of the ego vehicle, to cause the ego vehicle speed to change.

Additionally or alternatively, at the operation 806, for example, the actuation module 508 can cause a cruise control system, of the ego vehicle, to operate to change the ego vehicle speed. For example, the cruise control system can include an adaptive cruise control system.

For example, the cruise control system can be configured to optimize a model to maintain the range of the gap and the operation 806 can change at least one term in the model, add at least one term to the model, or remove at least one term from the model.

For example, the model can include an expression for an ego vehicle acceleration (a).

For example, the expression for the ego vehicle acceleration (a) can include a first term. The first term can include, in response to a current gap (s) between the ego vehicle and the preceding vehicle being less than the desired minimum gap ($s_{min}$), a product of a first gain ($k_1$) multiplied by a first difference. The first difference can be the desired minimum gap ($s_{min}$) subtracted from the current gap (s):

$$a = (k_1)(s - s_{min}), \text{ if } s < s_{min}$$

For example, the expression for the ego vehicle acceleration (a) can include a second term. The second term can include, in response to the current gap (s) being greater than the desired maximum gap ($s_{max}$), a product of a second gain ($k_2$) multiplied by a second difference. The second difference can be the desired maximum gap ($s_{max}$) subtracted from the current gap (s):

$$a=(k_2)(s-s_{max}), \text{ if } s>s_{max}$$

For example, the expression for the ego vehicle acceleration can include a third term. The third term can include a product of a third gain ($k_3$) multiplied by a third difference. The third difference can be the ego vehicle speed (v) subtracted from the desired speed ($v_d$):

$$a=(k_3)(v_d-v)$$

In a first implementation, the operation 806 can add a term to the expression for the ego vehicle acceleration (a). For example, the term, added to the expression for the ego vehicle acceleration (a), can include a product of a gain multiplied by a difference. For example, in response to the time, when the preceding vehicle speed ($v_{i-1}$) will equal the desired speed ($v_d$), being the first time (during the deceleration phase): (1) the gain can be a fifth gain ($k_5$) and (2) the difference can be the desired maximum gap ($s_{max}$) subtracted from a current gap between the ego vehicle and the preceding vehicle (s). Additionally or alternatively, for example, in response to the time, when the preceding vehicle speed ($v_{i-1}$) will equal the desired speed ($v_d$), being the second time (during the acceleration phase): (1) the gain can be a sixth gain ($k_6$) and (2) the difference can be the desired minimum gap ($s_{min}$) subtracted from the current gap (s).

For example, the operation 806 can add, in response to an existence of a condition, the term to the expression for the ego vehicle acceleration (a). For example, the condition can include: (1) an absolute value of a difference of the desired speed ($v_d$) subtracted from the preceding vehicle speed ($v_{i-1}$) being less than a threshold ($\varepsilon$) and (2) in response to the time, when the preceding vehicle speed ($v_{i-1}$) will equal the desired speed ($v_d$), being the first time (during the deceleration phase), a preceding vehicle acceleration ($a_{i-1}$) being negative. Additionally or alternatively, for example, the condition can include: (1) the absolute value of the difference of the desired speed ($v_d$) subtracted from the preceding vehicle speed ($v_{i-1}$) being less than the threshold ($\varepsilon$) and (2) in response to the time, when the preceding vehicle speed ($v_{i-1}$) will equal the desired speed ($v_d$), being the second time (during the acceleration phase), the preceding vehicle acceleration ($a_{i-1}$) being positive:

$$a=(k_4)(s-s_{max}), \text{ if } |v_{i-1}-v_d|<\varepsilon \text{ and } a_{i-1}<0$$

$$a=(k_5)(s-s_{min}), \text{ if } |v_{i-1}-v_d|<\varepsilon \text{ and } a_{i-1}>0$$

Additionally or alternatively, in a second implementation, the operation 806 can change a term of the expression for the ego vehicle acceleration (a). For example, the term of the expression for the ego vehicle acceleration can include a product of a gain multiplied by a first difference. The first difference can be the ego vehicle speed (v) subtracted from the desired speed ($v_d$). For example, the instructions to change the term of the expression for the ego vehicle acceleration can include instructions to change, in response to an existence of a condition, the desired speed ($v_d$) to a modified desired speed ($v_{mod}$). Change:

from $a=(k_3)(v_d-v)$ to $a=(k_3)(v_{mod}-v)$

For example, the condition can include a current time being between: (1) the time when the preceding vehicle speed ($v_{i-1}$) will equal the desired speed ($v_d$) (e.g., the first time or the second time) and (2) a desired time ($t_{desired}$).

For example, the modified desired speed ($v_{mod}$) can be a sum of the desired speed ($v_d$) added to a ratio. For example, the ratio can be a quotient of a second difference divided by a duration of time ($\Delta t$). For example, the duration of time ($\Delta t$) can be between: (1) the time when the preceding vehicle speed ($v_{i-1}$) will equal the desired speed ($v_d$) (e.g., the first time or the second time) and (2) the desired time ($t_{desired}$). For example, the second difference can be, in response to the time, when the preceding vehicle speed ($v_{i-1}$) will equal the desired speed ($v_d$), being the first time (during the deceleration phase), the desired maximum gap ($s_{max}$) subtracted from a current gap between the ego vehicle and the preceding vehicle (s). Additionally or alternatively, the second difference can be, in response to the time, when the preceding vehicle speed ($v_{i-1}$) will equal the desired speed ($v_d$), being the second time (during the acceleration phase), the desired minimum gap ($s_{min}$) subtracted from the current gap (s):

$$v_{mod}=v_d+[(s-s_{max})/\Delta t], \text{ if } a_{i-1}<0$$

$$v_{mod}=v_d+[(s-s_{min})/\Delta t], \text{ if } a_{i-1}>0$$

For example, the duration of time ($\Delta t$) can be equal to a period of the stop-and-go cycle.

Additionally, at an operation 808, for example, the calculations module 506 can obtain a measure of a period of the stop-and-go cycle. For example, the operation 808 can execute a first technique. The first technique can receive, from a first information source, the measure of the period of the stop-and-go cycle. Additionally or alternatively, for example, the operation 808 can execute a second technique. The second technique can: (1) receive, from a second information source, information related to the stop-and-go cycle and (2) determine, using the information, the measure of the period of the stop-and-go cycle.

For example, one or more of the first information source or the second information source can include one or more of: (1) a cloud-based server of a traffic monitoring system, (2) a roadside unit, (3) one or more other vehicles, or (4) one or more sensors of the ego vehicle.

For example, the one or more sensors can include one or more of a ranging sensor or an imaging sensor. For example, the ranging sensor can include one or more of a radar device, a lidar device, an ultrasonic ranging device, an infrared ranging device, or the like. For example, the imaging sensor can include one or more of a camera, an ultrasonic imaging device, an infrared imaging device, or the like. For example, the camera can include one or more of a color camera, a stereoscopic camera, a video camera, a digital video camera, or the like.

Additionally, at an operation 810, for example, the gap determination module 510 can determine the desired maximum gap ($s_{max}$). For example, the operation 810 can add the desired minimum gap ($s_{min}$) to a first difference.

For example, the time, when the preceding vehicle speed ($v_{i-1}$) will equal the desired speed ($v_d$), can include the first time and the second time. For example, the first time can be during the deceleration phase. For example, the second time can be during the acceleration phase. For example: (1) a first position can be a position of the preceding vehicle at the first time, (2) a second position can be a position of the preceding vehicle at the second time, (3) a third position can be a position of the ego vehicle at the first time, and (4) a fourth position can be a position of the ego vehicle at the second time. For example, the first difference can be a second difference subtracted from a third distance. For example, the second difference can be the third position subtracted from the fourth position. For example, the third difference can be the first position subtracted from the second position.

For example, the first difference can be a first term subtracted from a second term. For example, the first term can be the desired speed ($v_d$) multiplied by a duration of time ($\Delta t_{calc}$). For example, the duration of time ($\Delta t_{calc}$) can be between the first time and the second time. For example, a maximum value of the second term can be a distance traversed by the preceding vehicle during a single iteration of the stop-and-go cycle.

For example, the minimum desired gap ($s_{min}$) can be a sum of a constant added to a product. For example, the product can be the desired speed ($v_d$) multiplied by a duration of time ($\Delta t_{min}$). For example, the duration of time ($\Delta t_{min}$) can be between a first snapshot time and a second snapshot time. For example, the first snapshot time can be a time at which the preceding vehicle passes a point. For example, the second snapshot time can be a time at which the ego vehicle, moving at the desired speed ($v_d$), passes the point. For example, the constant can be a maximum allowed gap, between two vehicles, during a stop phase of a stop-and-go cycle of the two vehicles. For example, the constant can be two meters.

Figure 9:
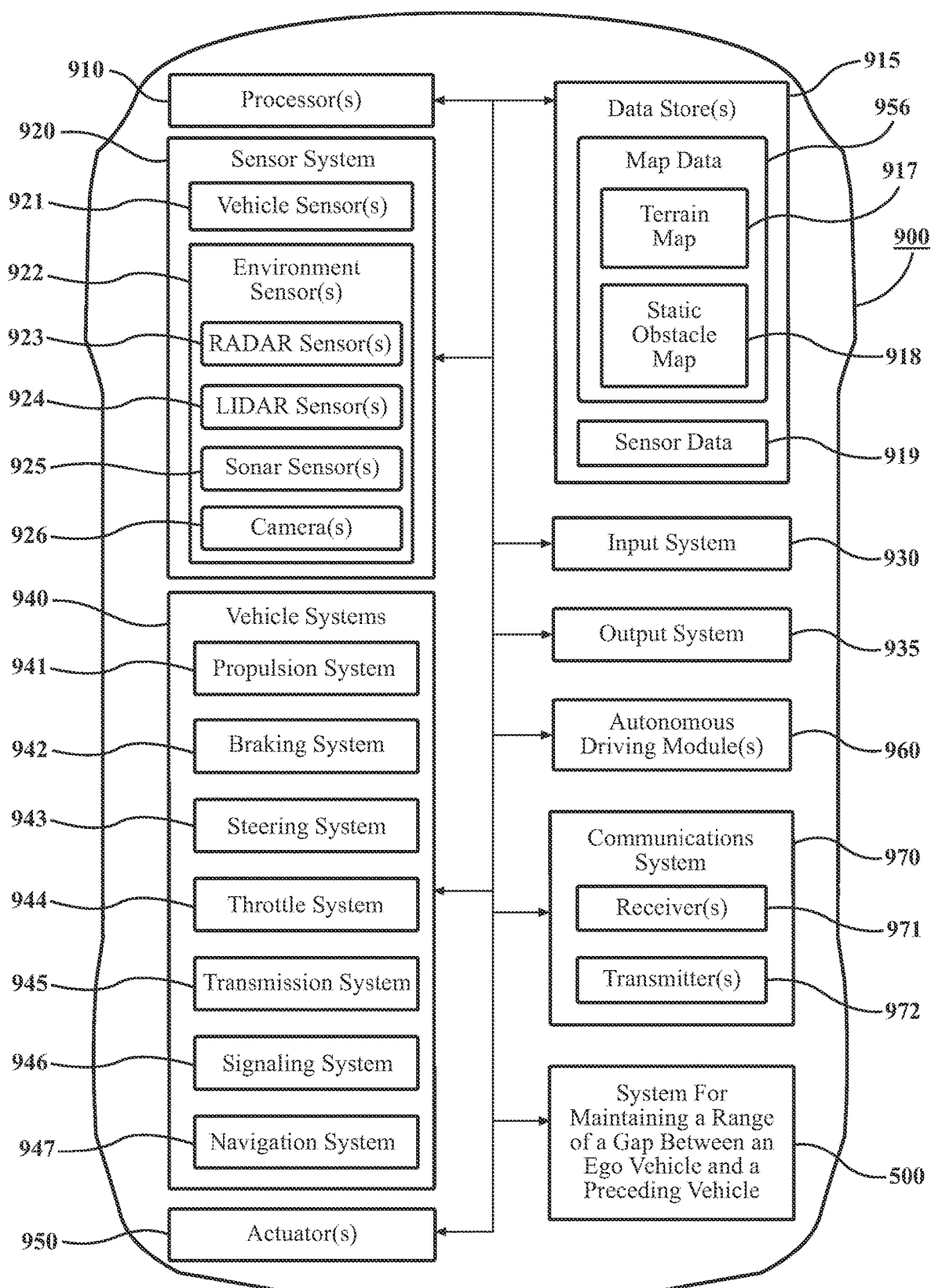
FIG. 9 includes a block diagram that illustrates an example of elements disposed on a vehicle, according to the disclosed technologies.

FIG. 9 includes a block diagram that illustrates an example of elements disposed on a vehicle 900, according to the disclosed technologies. As used herein, a "vehicle" can be any form of powered transport. In one or more implementations, the vehicle 900 can be an automobile. While arrangements described herein are with respect to automobiles, one of skill in the art understands, in light of the description herein, that embodiments are not limited to automobiles. For example, functions and/or operations of the ego vehicle 102 (illustrated in FIG. 1) can be realized by the vehicle 900.

In some embodiments, the vehicle 900 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 900 is performed according to inputs received from a user (e.g., human driver). In one or more arrangements, the vehicle 900 can be a conventional vehicle that is configured to operate in only a manual mode.

In one or more embodiments, the vehicle 900 can be an automated vehicle. As used herein, "automated vehicle" can refer to a vehicle that operates in an automated mode. As used herein, "automated mode" can refer to navigating and/or maneuvering the vehicle 900 along a travel route using one or more computing systems to control the vehicle 900 with minimal or no input from a human driver. In one or more embodiments, the vehicle 900 can be highly automated or completely automated. In one embodiment, the vehicle 900 can be configured with one or more semi-automated operational modes in which one or more computing systems perform a portion of the navigation and/or maneuvering of the vehicle along a travel route, and a vehicle operator (i.e., driver) provides inputs to the vehicle 900 to perform a portion of the navigation and/or maneuvering of the vehicle 900 along a travel route.

For example, Standard J3016, Taxonomy and Definitions for Terms Related to Driving Automation Systems for On-Road Motor Vehicles, issued by the Society of Automotive Engineers (SAE) International on Jan. 16, 2014, and most recently revised on Jun. 15, 2018, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 900 can include various elements. The vehicle 900 can have any combination of the various elements illustrated in FIG. 9. In various embodiments, it may not be necessary for the vehicle 900 to include all of the elements illustrated in FIG. 9. Furthermore, the vehicle 900 can have elements in addition to those illustrated in FIG. 9. While the various elements are illustrated in FIG. 9 as being located within the vehicle 900, one or more of these elements can be located external to the vehicle 900. Furthermore, the elements illustrated may be physically separated by large distances. For example, as described, one or more components of the disclosed system can be implemented within the vehicle 900 while other components of the system can be implemented within a cloud-computing environment, as described below. For example, the elements can include one or more processors 910, one or more data stores 915, a sensor system 920, an input system 930, an output system 935, vehicle systems 940, one or more actuators 950, one or more automated driving modules 960, a communications system 970, and the system 500 for maintaining a range of a gap between an ego vehicle and a preceding vehicle.

In one or more arrangements, the one or more processors 910 can be a main processor of the vehicle 900. For example, the one or more processors 910 can be an electronic control unit (ECU). For example, functions and/or operations of the processor 502 (illustrated in FIG. 5) can be realized by the one or more processors 910.

The one or more data stores 915 can store, for example, one or more types of data. The one or more data stores 915 can include volatile memory and/or non-volatile memory. For example, functions and/or operations of the memory 504 (illustrated in FIG. 5) can be realized by the one or more data stores 915. Examples of suitable memory for the one or more data stores 915 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 915 can be a component of the one or more processors 910. Additionally or alternatively, the one or more data stores 915 can be operatively connected to the one or more processors 910 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 915 can store map data 916. The map data 916 can include maps of one or more geographic areas. In some instances, the map data 916 can include information or data on roads, traffic control devices, road markings, structures, features, and/or landmarks in the one or more geographic areas. The map data 916 can be in any suitable form. In some instances, the map data 916 can include aerial views of an area. In some instances, the map data 916 can include ground views of an area, including 360-degree ground views. The map data 916 can include measurements, dimensions, distances, and/or information for one or more items included in the map data 916 and/or relative to other items included in the map data 916. The map data 916 can include a digital map with information about road geometry. The map data 916 can be high quality and/or highly detailed.

In one or more arrangements, the map data 916 can include one or more terrain maps 917. The one or more terrain maps 917 can include information about the ground, terrain, roads, surfaces, and/or other features of one or more geographic areas. The one or more terrain maps 917 can include elevation data of the one or more geographic areas. The map data 916 can be high quality and/or highly detailed. The one or more terrain maps 917 can define one or more ground surfaces, which can include paved roads, unpaved roads, land, and other things that define a ground surface.

In one or more arrangements, the map data 916 can include one or more static obstacle maps 918. The one or more static obstacle maps 918 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 918 can have location data, size data, dimension data, material data, and/or other data associated with them. The one or more static obstacle maps 918 can include measurements, dimensions, distances, and/or information for one or more static obstacles. The one or more static obstacle maps 918 can be high quality and/or highly detailed. The one or more static obstacle maps 918 can be updated to reflect changes within a mapped area.

In one or more arrangements, the one or more data stores 915 can store sensor data 919. As used herein, "sensor data" can refer to any information about the sensors with which the vehicle 900 can be equipped including the capabilities of and other information about such sensors. The sensor data 919 can relate to one or more sensors of the sensor system 920. For example, in one or more arrangements, the sensor data 919 can include information about one or more lidar sensors 924 of the sensor system 920.

In some arrangements, at least a portion of the map data 916 and/or the sensor data 919 can be located in one or more data stores 915 that are located onboard the vehicle 900. Additionally or alternatively, at least a portion of the map data 916 and/or the sensor data 919 can be located in one or more data stores 915 that are located remotely from the vehicle 900.

The sensor system 920 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 920 includes a plurality of sensors, the sensors can work independently from each other. Alternatively, two or more of the sensors can work in combination with each other. In such a case, the two or more sensors can form a sensor network. The sensor system 920 and/or the one or more sensors can be operatively connected to the one or more processors 910, the one or more data stores 915, and/or another element of the vehicle 900 (including any of the elements illustrated in FIG. 9). The sensor system 920 can acquire data of at least a portion of the external environment of the vehicle 900 (e.g., nearby vehicles). The sensor system 920 can include any suitable type of sensor. Various examples of different types of sensors are described herein. However, one of skill in the art understands that the embodiments are not limited to the particular sensors described herein.

The sensor system 920 can include one or more vehicle sensors 921. The one or more vehicle sensors 921 can detect, determine, and/or sense information about the vehicle 900 itself. In one or more arrangements, the one or more vehicle sensors 921 can be configured to detect and/or sense position and orientation changes of the vehicle 900 such as, for example, based on inertial acceleration. In one or more arrangements, the one or more vehicle sensors 921 can include one or more accelerometers, one or more gyroscopes, an inertial measurement unit (IMU), a dead-reckoning system, a global navigation satellite system (GNSS), a global positioning system (GPS), a navigation system 947, and/or other suitable sensors. The one or more vehicle sensors 921 can be configured to detect and/or sense one or more characteristics of the vehicle 900. In one or more arrangements, the one or more vehicle sensors 921 can include a speedometer to determine a current speed of the vehicle 900.

Additionally or alternatively, the sensor system 920 can include one or more environment sensors 922 configured to acquire and/or sense driving environment data. As used herein, "driving environment data" can include data or information about the external environment in which a vehicle is located or one or more portions thereof. For example, the one or more environment sensors 922 can be configured to detect, quantify, and/or sense obstacles in at least a portion of the external environment of the vehicle 900 and/or information/data about such obstacles. Such obstacles may be stationary objects and/or dynamic objects. The one or more environment sensors 922 can be configured to detect, measure, quantify, and/or sense other things in the external environment of the vehicle 900 such as, for example, lane markers, signs, traffic lights, traffic signs, lane lines, crosswalks, curbs proximate the vehicle 900, off-road objects, etc.

Various examples of sensors of the sensor system 920 are described herein. The example sensors may be part of the one or more vehicle sensors 921 and/or the one or more environment sensors 922. However, one of skill in the art understands that the embodiments are not limited to the particular sensors described.

In one or more arrangements, the one or more environment sensors 922 can include one or more radar sensors 923, one or more lidar sensors 924, one or more sonar sensors 925, and/or one more cameras 926. In one or more arrangements, the one or more cameras 926 can be one or more high dynamic range (HDR) cameras or one or more infrared (IR) cameras. For example, the one or more cameras 926 can be used to record a reality of a state of an item of information that can appear in the digital map. For example, functions and/or operations of one or more of the one or more sensors 116 (illustrated in FIG. 1) can be realized by the one or more environment sensors 922.

The input system 930 can include any device, component, system, element, arrangement, or groups thereof that enable information/data to be entered into a machine. The input system 930 can receive an input from a vehicle passenger (e.g., a driver or a passenger). The output system 935 can include any device, component, system, element, arrangement, or groups thereof that enable information/data to be presented to a vehicle passenger (e.g., a driver or a passenger).

Various examples of the one or more vehicle systems 940 are illustrated in FIG. 9. However, one of skill in the art understands that the vehicle 900 can include more, fewer, or different vehicle systems. Although particular vehicle systems can be separately defined, each or any of the systems or portions thereof may be otherwise combined or segregated via hardware and/or software within the vehicle 900. For example, the one or more vehicle systems 940 can include a propulsion system 941, a braking system 942, a steering system 943, a throttle system 944, a transmission system 945, a signaling system 946, and/or the navigation system 947. Each of these systems can include one or more devices, components, and/or a combination thereof, now known or later developed. For example, functions and/or operations of the one or more vehicle systems 118 (illustrated in FIG. 1) can be realized by the one or more vehicle systems 940.

The navigation system 947 can include one or more devices, applications, and/or combinations thereof, now known or later developed, configured to determine the geographic location of the vehicle 900 and/or to determine a travel route for the vehicle 900. The navigation system 947 can include one or more mapping applications to determine a travel route for the vehicle 900. The navigation system 947 can include a global positioning system, a local positioning system, a geolocation system, and/or a combination thereof.

The one or more actuators 950 can be any element or combination of elements operable to modify, adjust, and/or alter one or more of the vehicle systems 940 or components thereof responsive to receiving signals or other inputs from the one or more processors 910 and/or the one or more automated driving modules 960. Any suitable actuator can be used. For example, the one or more actuators 950 can include motors, pneumatic actuators, hydraulic pistons, relays, solenoids, and/or piezoelectric actuators.

The one or more processors 910 and/or the one or more automated driving modules 960 can be operatively connected to communicate with the various vehicle systems 940 and/or individual components thereof. For example, the one or more processors 910 and/or the one or more automated driving modules 960 can be in communication to send and/or receive information from the various vehicle systems 940 to control the movement, speed, maneuvering, heading, direction, etc. of the vehicle 900. The one or more processors 910 and/or the one or more automated driving modules 960 may control some or all of these vehicle systems 940 and, thus, may be partially or fully automated.

The one or more processors 910 and/or the one or more automated driving modules 960 may be operable to control the navigation and/or maneuvering of the vehicle 900 by controlling one or more of the vehicle systems 940 and/or components thereof. For example, when operating in an automated mode, the one or more processors 910 and/or the one or more automated driving modules 960 can control the direction and/or speed of the vehicle 900. The one or more processors 910 and/or the one or more automated driving modules 960 can cause the vehicle 900 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner.

The communications system 970 can include one or more receivers 971 and/or one or more transmitters 972. The communications system 970 can receive and transmit one or more messages through one or more wireless communications channels. For example, functions and/or operations of one or more of the communications device 114 (illustrated in FIG. 1) can be realized by the communications system 970. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 970 can include "connected vehicle" technology. "Connected vehicle" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

Moreover, the one or more processors 910, the one or more data stores 915, and the communications system 970 can be configured to one or more of form a micro cloud, participate as a member of a micro cloud, or perform a function of a leader of a mobile micro cloud. A micro cloud can be characterized by a distribution, among members of the micro cloud, of one or more of one or more computing resources or one or more data storage resources in order to collaborate on executing operations. The members can include at least connected vehicles.

The vehicle 900 can include one or more modules, at least some of which are described herein. The modules can be implemented as computer-readable program code that, when executed by the one or more processors 910, implement one or more of the various processes described herein. One or more of the modules can be a component of the one or more processors 910. Additionally or alternatively, one or more of the modules can be executed on and/or distributed among other processing systems to which the one or more processors 910 can be operatively connected. The modules can include instructions (e.g., program logic) executable by the one or more processors 910. Additionally or alternatively, the one or more data store 915 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 900 can include one or more automated driving modules 960. The one or more automated driving modules 960 can be configured to receive data from the sensor system 920 and/or any other type of system capable of capturing information relating to the vehicle 900 and/or the external environment of the vehicle 900. In one or more arrangements, the one or more automated driving modules 960 can use such data to generate one or more driving scene models. The one or more automated driving modules 960 can determine position and velocity of the vehicle 900. The one or more automated driving modules 960 can determine the location of obstacles, obstacles, or other environmental features including traffic signs, trees, shrubs, neighboring vehicles, pedestrians, etc.

The one or more automated driving modules 960 can be configured to receive and/or determine location information for obstacles within the external environment of the vehicle 900 for use by the one or more processors 910 and/or one or more of the modules described herein to estimate position and orientation of the vehicle 900, vehicle position in global coordinates based on signals from a plurality of satellites, or any other data and/or signals that could be used to determine the current state of the vehicle 900 or determine the position of the vehicle 900 with respect to its environment for use in either creating a map or determining the position of the vehicle 900 in respect to map data.

The one or more automated driving modules 960 can be configured to determine one or more travel paths, current automated driving maneuvers for the vehicle 900, future automated driving maneuvers and/or modifications to current automated driving maneuvers based on data acquired by the sensor system 920, driving scene models, and/or data from any other suitable source such as determinations from the sensor data 919. As used herein, "driving maneuver" can refer to one or more actions that affect the movement of a vehicle. Examples of driving maneuvers include: accelerating, decelerating, braking, turning, moving in a lateral direction of the vehicle 900, changing travel lanes, merging into a travel lane, and/or reversing, just to name a few possibilities. The one or more automated driving modules 960 can be configured to implement determined driving maneuvers. The one or more automated driving modules 960 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 960 can be configured to execute various vehicle functions and/or to transmit data to, receive data from, interact with, and/or control the vehicle 900 or one or more systems thereof (e.g., one or more of vehicle systems 940). For example, functions and/or operations of an automotive navigation system can be realized by the one or more automated driving modules 960.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-9, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a processor; and
a memory storing:
a calculations module including instructions that, when executed by the processor, cause the processor to:
determine a time, during a deceleration phase or an acceleration phase of a stop-and-go cycle of a preceding vehicle, when a preceding vehicle speed will equal a desired speed of an ego vehicle; and
determine, in response to the time being during:
the deceleration phase, that a gap, between the preceding vehicle and the ego vehicle, will be smaller than a desired maximum gap, or
the acceleration phase, that the gap will be larger than a desired minimum gap; and
an actuation module including instructions that, when executed by the processor, cause the processor to change an ego vehicle speed to optimize a model of a cruise control system to correct the gap by:
adding a product of a gain multiplied by a difference to the model as a gap maintaining term,
adding, in response to a condition in which an absolute value of a difference of the desired speed subtracted from the preceding vehicle speed being less than a threshold, at least one term to the model, or
changing, in the model, a product of a gain multiplied by a first difference to account for a period of the stop-and-go cycle.

2. The system of claim 1, wherein:
the instructions to change the ego vehicle speed include instructions to cause the cruise control system, of the ego vehicle, to operate to change the ego vehicle speed,
the cruise control system is configured to optimize the model to maintain a range of the gap, and
the instructions to change the ego vehicle speed include at least one of instructions to change the at least one term in the model, instructions to add the at least one term to the model, or instructions to remove the at least one term from the model.

3. The system of claim 2, wherein the model includes an expression for an ego vehicle acceleration.

4. The system of claim 3, wherein the instructions to change the ego vehicle speed include instructions to add the at least one term to the expression for the ego vehicle acceleration.

5. The system of claim 4, wherein:
the at least one term, added to the expression for the ego vehicle acceleration, includes the product of the gain multiplied by the difference, and
in response to the time, when the preceding vehicle speed will equal the desired speed, being during:
the deceleration phase:
the gain is a first gain, and
the difference is the desired maximum gap subtracted from a current gap between the ego vehicle and the preceding vehicle, or the acceleration phase:
  the gain is a second gain, and
  the difference is the desired minimum gap subtracted from the current gap.

6. The system of claim 4, wherein the instructions to add the at least one term to the expression for the ego vehicle acceleration include instructions to add, in response to an existence of the condition, the at least one term to the expression for the ego vehicle acceleration.

7. The system of claim 6, wherein the condition comprises:
  in response to the time, when the preceding vehicle speed will equal the desired speed, being during:
    the deceleration phase, a preceding vehicle acceleration being negative, or
    the acceleration phase, the preceding vehicle acceleration being positive.

8. The system of claim 3, wherein the instructions to change the ego vehicle speed include instructions to change the at least one term of the expression for the ego vehicle acceleration.

9. The system of claim 8, wherein the at least one term of the expression for the ego vehicle acceleration includes the product of the gain multiplied by the first difference, the first difference being the ego vehicle speed subtracted from the desired speed.

10. The system of claim 9, wherein the instructions to change the at least one term of the expression for the ego vehicle acceleration include instructions to change, in response to an existence of a different condition, the desired speed to a modified desired speed.

11. The system of claim 10, wherein the different condition comprises a current time being between the time when the preceding vehicle speed will equal the desired speed and a desired time.

12. The system of claim 10, wherein:
  the modified desired speed is a sum of the desired speed added to a ratio,
  the ratio is a quotient of a second difference divided by a duration of time,
  the duration of time is between the time when the preceding vehicle speed will equal the desired speed and a desired time, and
  the second difference is, in response to the time when the preceding vehicle speed will equal the desired speed being during:
    the deceleration phase, the desired maximum gap subtracted from a current gap between the ego vehicle and the preceding vehicle, or
    the acceleration phase, the desired minimum gap subtracted from the current gap.

13. The system of claim 12, wherein the duration of time equals the period of the stop-and-go cycle.

14. A method, comprising:
  determining, by a processor, a time, during a deceleration phase or an acceleration phase of a stop-and-go cycle of a preceding vehicle, when a preceding vehicle speed will equal a desired speed of an ego vehicle;
  determining, by the processor, in response to the time being during:
    the deceleration phase, that a gap, between the preceding vehicle and the ego vehicle, will be smaller than a desired maximum gap, or
    the acceleration phase, that the gap will be larger than a desired minimum gap; and
  changing, by the processor, an ego vehicle speed to optimize a model of a cruise control system to correct the gap by:
    adding a product of a gain multiplied by a difference to the, model as a gap maintaining term,
    adding, in response to a condition in which an absolute value of a difference of the desired speed subtracted from the preceding vehicle speed being less than a threshold, at least one term to the model, or
    changing, in the model, a product of a gain multiplied by a first difference to account for a period of the stop-and-go cycle.

15. The method of claim 14, further comprising determining, by the processor, the desired maximum gap.

16. The method of claim 15, wherein the determining the desired maximum gap comprises adding the desired minimum gap to a second difference.

17. The method of claim 16, wherein:
  the time, when the preceding vehicle speed will equal the desired speed, comprises a first time and a second time,
  the first time is during the deceleration phase,
  the second time is during the acceleration phase,
  a first position is a position of the preceding vehicle at the first time,
  a second position is a position of the preceding vehicle at the second time,
  a third position is a position of the ego vehicle at the first time,
  a fourth position is a position of the ego vehicle at the second time,
  the first difference is a second difference subtracted from a third distance,
  the second difference is the third position subtracted from the fourth position, and
  the third difference is the first position subtracted from the second position.

18. The method of claim 17, wherein:
  the second difference is a first term subtracted from a second term,
  the first term is the desired speed multiplied by a duration of time, the duration of time being between the first time and the second time, and
  a maximum value of the second term is a distance traversed by the preceding vehicle during a single iteration of the stop-and-go cycle.

19. The method of claim 16, wherein:
  the minimum desired gap is a sum of a constant added to a product,
  the product is the desired speed multiplied by a duration of time,
  the duration of time is between a first time and a second time,
  the first time is a time at which the preceding vehicle passes a point, and
  the second time is a time at which the ego vehicle, moving at the desired speed, passes the point.

20. A non-transitory computer-readable medium for maintaining a range of a gap between an ego vehicle and a preceding vehicle, the non-transitory computer-readable medium including instructions that, when executed by one or more processors, cause the one or more processors to:
  determine a time, during a deceleration phase or an acceleration phase of a stop-and-go cycle of a preceding vehicle, when a preceding vehicle speed will equal a desired speed of an ego vehicle;

determine, in response to the time being during:
- the deceleration phase, that a gap, between the preceding vehicle and the ego vehicle, will be smaller than a desired maximum gap, or
- the acceleration phase, that the gap will be larger than a desired minimum gap; and change an ego vehicle speed to optimize a model of a cruise control system to correct the gap by:
- adding a product of a gain multiplied by a difference to the, model as a gap maintaining term,
- adding, in response to a condition in which an absolute value of a difference of the desired speed subtracted from the preceding vehicle speed being less than a threshold, at least one term to the model, or
- changing, in the model, a product of a gain multiplied by a first difference to account for a period of the stop-and-go cycle.

* * * * *

UNITED STATES PATENT AND TRADEMARK OFFICE
CERTIFICATE OF CORRECTION

PATENT NO. : 12,325,420 B2  
APPLICATION NO. : 18/078499  
DATED : June 10, 2025  
INVENTOR(S) : Yashar Zeiynali Farid and Kentaro Oguchi Page 1 of 1

It is certified that error appears in the above-identified patent and that said Letters Patent is hereby corrected as shown below:

In the Claims

Claim 14, Column 28, Line 5: delete "the, model" and insert --the model--.

Claim 20, Column 29, Line 10: delete "the, model" and insert --the model--.

Signed and Sealed this  
Fifteenth Day of July, 2025

Coke Morgan Stewart  
*Acting Director of the United States Patent and Trademark Office*